(12) United States Patent
Caldwell

(10) Patent No.: US 10,126,533 B1
(45) Date of Patent: Nov. 13, 2018

(54) ANAMORPHIC OPTICAL SYSTEM WITY RELATIVE SMALL SQUEEZE RATIO BUT WITH RELATIVELY PRONOUNCED RESIDUAL ANAMORPHIC CHARACTERISTICS

(71) Applicant: J. Brian Caldwell, Petersburg, VA (US)

(72) Inventor: J. Brian Caldwell, Petersburg, VA (US)

( * ) Notice: Subject to any disclaimer, the term of this patent is extended or adjusted under 35 U.S.C. 154(b) by 3 days.

(21) Appl. No.: 15/663,178

(22) Filed: Jul. 28, 2017

Related U.S. Application Data

(60) Provisional application No. 62/368,895, filed on Jul. 29, 2016.

(51) Int. Cl.
*G02B 13/12* (2006.01)
*G02B 9/64* (2006.01)
*G02B 27/09* (2006.01)

(52) U.S. Cl.
CPC .............. *G02B 13/12* (2013.01); *G02B 9/64* (2013.01); *G02B 27/0911* (2013.01)

(58) Field of Classification Search
CPC ....... G02B 13/12; G02B 27/0911; G02B 9/64
See application file for complete search history.

(56) References Cited

U.S. PATENT DOCUMENTS

| | | | |
|---|---|---|---|
| 2,933,017 A | 4/1960 | Kingslake et al. | |
| 4,362,366 A | 12/1982 | Gottschalk | |
| 6,995,920 B2 | 2/2006 | Nurishi | |
| 7,085,066 B2 | 8/2006 | Neil | |
| 7,349,062 B2 | 3/2008 | Neil | |
| 8,174,733 B2 | 5/2012 | Pretorius | |
| 8,858,099 B2 | 10/2014 | Dodoc | |
| 9,063,321 B2 | 6/2015 | Navarro et al. | |
| 9,341,827 B2 | 5/2016 | Neil | |
| 2014/0016210 A1* | 1/2014 | Valles Navarro | G02B 13/08 359/671 |
| 2016/0103302 A1 | 4/2016 | Neil | |

* cited by examiner

*Primary Examiner* — Joseph P Martinez
(74) *Attorney, Agent, or Firm* — Opticus IP Law PLLC

(57) ABSTRACT

An anamorphic objective having a relatively small anamorphic factor but with relatively pronounced residual anamorphic artifacts is formed by reducing the anamorphic factor with anamorphic lens elements located on the image side of the aperture stop. The lens section on the object side of the aperture stop must therefore have a relatively large anamorphic factor, and this creates the desired residual anamorphic artifacts. The disclosed anamorphic objective is suited either to an integrated optical design or to a modular approach in which the anamorphic factor reduction optics are connected as a removable attachment to an independently well-corrected anamorphic optical system. The anamorphic objective has a relatively small anamorphic squeeze ratio while simultaneously producing relatively large residual anamorphic characteristics.

20 Claims, 13 Drawing Sheets

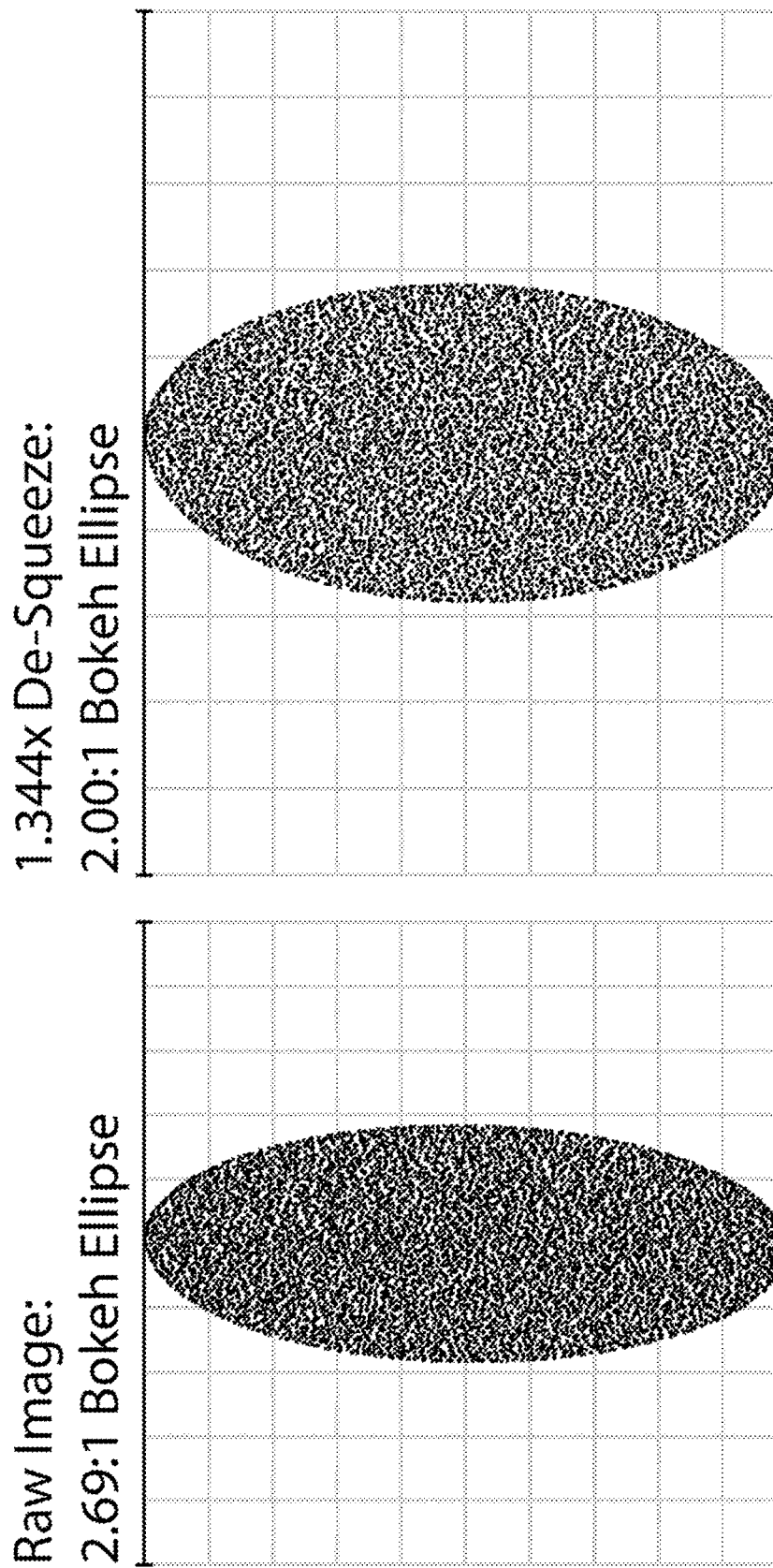

ANAMORPHIC OPTICAL SYSTEM WITY RELATIVE SMALL SQUEEZE RATIO BUT WITH RELATIVELY PRONOUNCED RESIDUAL ANAMORPHIC CHARACTERISTICS

CROSS-REFERENCE TO RELATED APPLICATIONS

This application claims the benefit of priority under 35 USC 119(e) of U.S. Provisional Patent Application Ser. No. 62/368,895, filed on Jul. 29, 2016, and which is incorporated by reference herein.

FIELD

The present disclosure is directed to an anamorphic optical arrangement or anamorphic objective for producing a relatively small anamorphic squeeze ratio while simultaneously producing relatively large residual anamorphic characteristics. The present disclosure may be arranged as a rear anamorphic attachment designed to work with a front anamorphic objective, or it may be arranged as a permanently integrated anamorphic lens with the desired squeeze ratio and anamorphic characteristics.

BACKGROUND ART

Anamorphic lenses were originally developed for cinematography in order to provide a wide screen format while making use of a relatively large negative size. For example, the current standard negative size for anamorphic shooting measures 0.825"×0.69", giving an aspect ratio of 1.1956:1. If a 2× squeeze anamorphic lens is used to form an image on this format, and the image is then de-squeezed by a factor of two then the final aspect ratio is 2.39:1, which is the current DCI Scope ratio used for theatrical projection. If a 2.39:1 aspect ratio were shot directly on a 0.825" wide format the format size would be 0.825"×0.345", which is only half the area of the anamorphic format. By using a larger film negative the overall image quality was improved while simultaneously permitting a wide screen ratio, and this provided all the justification needed to develop and use anamorphic optics for cinematography.

As digital cinematography has largely superseded film cinematography, the original reasons for using anamorphic lenses have become less important. However, anamorphic lenses provide unique artistic opportunities due to their residual optical characteristics. Chief among these characteristics for a so-called front anamorphic lens are differential depth of field in the horizontal and vertical directions, along with elliptically-shaped defocused point images oriented so that the short side of the ellipse coincided with the axis of greatest anamorphic power. This last characteristic is also commonly referred to as "elliptical bokeh" or "oval bokeh", where "bokeh" refers to the character of the defocused image. Bokeh can be thought of as the way a lens renders defocused light points of light and is considered an aesthetic quality that in cinemagraphic applications is considered desirable.

There are two main classes of anamorphic lenses. The first class is the so-called front anamorphic type, in which most or all of the anamorphic power is achieved by means of cylindrical and/or toroidal lens elements placed on the object side of the aperture stop. From now on these cylindrical and/or toroidal lens elements shall be referred to as "anamorphic lens elements". The second class is the so-called rear anamorphic type, in which most or all of the anamorphic power is achieved by means of anamorphic lens elements placed on the image side of the aperture stop. Generally, the front anamorphic type is the more desirable of the two, since this type produces elliptical bokeh and differential depth of field, but the rear anamorphic type does not when a circular aperture stop is used. Rear anamorphic lenses are typically large zoom lenses, which would be impractically large if designed with the anamorphic power in the front.

In front anamorphic lenses and/or attachments most of the anamorphic optical power is in the horizontal direction. The usual arrangement is an afocal reversed-Galilean anamorphic front which reduces the focal length in the horizontal direction while either leaving the focal length alone in the vertical direction or else modifying it to a lesser extent than in the horizontal direction. It is useful to think of front anamorphics as squeezing the image in the horizontal direction. So, the image of a circular object will be an ellipse with the long direction oriented vertically. The elliptical in-focus image of a circular object is rendered circular during the de-squeezing process.

In rear anamorphic lenses and/or attachments most of the anamorphic optical power is in the vertical direction. The usual arrangement is a tele-extender style rear attachment which increases the focal length in the vertical direction while either leaving the focal length alone in the horizontal direction or else modifying it to a lesser extent than in the vertical direction. In this case it is useful to think of function of the rear anamorph as stretching the image in the vertical direction. The image of a circular object will be an ellipse with the long direction oriented vertically, just as in the case with a front anamorph, and again a de-squeezing process is required in order to transform the elliptical in-focus image of a circular object into a proper circle. However, there are important differences between front and rear anamorphic lenses which will be discussed below.

It is important to note that the desirable residual anamorphic characteristics of differential depth of field and elliptical bokeh do not include the squeeze ratio. The squeeze ratio is essentially a paraxial quantity that is eliminated for display by a de-squeezing process. Thus, an image taken with a 2× squeeze anamorphic on a 4:3 image format will be stretched, or de-squeezed, by the same 2× factor for display. For film display this has historically been done with an anamorphic projection lens, but for digital display this can be easily done during post-processing. After de-squeeze, the elliptical image of a circular object will become properly circular. The desirable anamorphic characteristics mentioned above are what is left over after the de-squeeze process.

Front anamorphic lenses are generally available in a 2× squeeze ratio, which yields the standard 2.39:1 DCI Scope format when shot on a 1.1956:1 aspect ratio film negative or electronic image sensor. Another very useful squeeze ratio is substantially 1.79×, which will yield an exact 2.39:1 DCI Scope format when shot on a 4:3 aspect ratio sensor.

Front anamorphic lenses are also available in approximately 1.3 to 1.35× squeeze ratio Q, which is approximately what is needed to yield Scope format output when shot on a 16:9 aspect ratio image sensor. The actual squeeze ratio Q needed to produce 2.39:1 DCI Scope output from a 16:9 sensor is 1.344×. In other words, if a 1.344× squeeze anamorphic lens is used on a 16:9 sensor and the image is then de-squeezed or stretched by 1.344× the final output will be (16×1.344)/9=2.39:1. A 1.344× squeeze anamorphic is particularly desirable because 16:9 sensors are very common in video and cine cameras. In this case, a 1.344× squeeze anamorphic lens utilizes the full 16:9 sensor without any need to crop the image during post processing.

In addition, if a 1.344× squeeze anamorphic is used on a 4:3 aspect ratio sensor, also common in video and cine cameras, the output aspect ratio after de-squeezing by 1.344× will be 1.792:1, or 16.128:9, which is nearly identical to the standard HDTV aspect ratio of 16:9 which is commonly used for TV broadcast and commercials.

Unfortunately, a front anamorphic lens with a squeeze ratio of 1.344× or smaller will have only mild anamorphic characteristics, and as a result many cinematographers would prefer to simply crop in post rather than bother with the expense of anamorphic. Accordingly, there is a need for anamorphic lenses having a relatively small squeeze ratio Q that retains relatively pronounced anamorphic characteristics of elliptical bokeh and differential depth of field generally found in anamorphic lenses having a relatively large squeeze ratio.

Many anamorphic optical systems have been described in the prior art, but none of these provide for a simultaneous combination of a relatively small squeeze ratio with relatively pronounced anamorphic characteristics. In U.S. Pat. No. 4,362,366 by Gottschalk, a compound anamorphic optical system is disclosed that combines a conventional reversed-Galilean type afocal front anamorphic section and a rear type anamorphic focal length extender. However, in this case the purpose of the rear anamorphic section is to allow a reduced anamorphic power in the front section so that the size and weight of the system as a whole may be reduced while simultaneously permitting improved aberration correction. Accordingly, although the claimed optical system has a large anamorphic squeeze factor it has only mild residual anamorphic characteristics.

In U.S. Pat. No. 8,174,733 by Pretorius and U.S. Pat. No. 8,858,099 by Dodoc et al. anamorphic optical systems are disclosed which have anamorphic lens elements on both sides of the aperture stop. However, the anamorphic lens elements on the image side of the stop in these disclosed designs serves primarily to correct residual aberrations, and similar to the Gottschalk system the result is an anamorphic lens system with a large squeeze factor but only mild residual anamorphic characteristics.

SUMMARY

An anamorphic objective having a relatively small anamorphic factor but with relatively pronounced residual anamorphic artifacts is formed by reducing the anamorphic factor with anamorphic lens elements located on the image side of the aperture stop. The lens section on the object side of the aperture stop must therefore have a relatively large anamorphic factor, and this creates the desired residual anamorphic artifacts. The disclosed anamorphic objective is suited either to an integrated optical design or to a modular approach in which the anamorphic factor reduction optics are connected as a removable attachment to an independently well-corrected anamorphic optical system. The anamorphic objective has a relatively small anamorphic squeeze ratio while simultaneously producing relatively large residual anamorphic characteristics.

An aspect of the disclosure is an anamorphic objective for forming an image at an image plane of an object at an object plane, comprising: a) at least one first plane of symmetry and at least one second plane of symmetry, wherein the first plane of symmetry is perpendicular to the second plane of symmetry; b) at least one first objective section and at least one second objective section wherein the first objective section is located closest to the object and the second objective section is located closest to the image; c) an aperture stop located between the first objective section and the second objective section; d) at least one anamorphic optical element located in the first objective section and at least one anamorphic optical element located in the second objective section; and e) wherein the following conditions are met: i) $f_T'>f_W'$ and ii) $M_{CRW}>M_{CRT}$, wherein $f_T'$ is a focal length of the anamorphic objective with respect to the first plane of symmetry, $f_W'$ is a focal length of the anamorphic objective with respect to the second plane of symmetry, $M_{CRT}$ is a chief ray angle in the first plane of symmetry at the image plane divided by a chief ray angle in the first plane of symmetry at the aperture stop, and $M_{CRW}$ is a chief ray angle in the second plane of symmetry at the image plane divided by a chief ray angle in the second plane of symmetry at the aperture stop.

Another aspect of the disclosure is the anamorphic objective as described above, wherein a total squeeze ratio is defined by $Q=f_T'/f_W'$, and wherein $1.0 \leq Q \leq 2.27$.

Another aspect of the disclosure is the anamorphic objective as described above, wherein $1.0 \leq Q \leq 1.7$.

Another aspect of the disclosure is the anamorphic objective as described above, wherein $1.1 \leq Q \leq 1.6$.

Another aspect of the disclosure is the anamorphic objective as described above, wherein $1.125 \leq Q \leq 1.55$.

Another aspect of the disclosure is the anamorphic objective as described above, wherein the at least one anamorphic element in the second objective section has zero optical power in the first plane of symmetry.

Another aspect of the disclosure is the anamorphic objective as described above, wherein the second objective section comprises an objectwise group of lens elements and an imagewise group of lens elements, wherein the imagewise group of lens elements includes at least one anamorphic lens element and is configured as an adapter that operably engages with the objectwise group of lens elements.

Another aspect of the disclosure is the anamorphic objective as described above, wherein the first objective section and the objectwise group of lens elements define a well-corrected anamorphic lens system having a squeeze ratio $Q_{LS}$ that is greater than the total squeeze ratio Q.

Another aspect of the disclosure is the anamorphic objective as described above, wherein: a) the first objective section has a first squeeze ratio $Q_F$ in the range $1.6<Q_F<2.5$; b) the second objective section has a second squeeze ratio $Q_R$ in the range $1.0<Q_R<1.6$; and c) wherein the ratio $Q_F/Q_R$ is in the range $1.0<Q_F/Q_R<2.27$.

Another aspect of the disclosure is the anamorphic objective as described above, wherein $1.7<Q_F<2.0$ and $1.1<Q_R<1.5$, and $1.13<Q_F/Q_R<1.82$.

Another aspect of the disclosure is the anamorphic objective as described above, wherein a first objective section comprises a Stokes lens.

Another aspect of the disclosure is an anamorphic objective that comprises in order from an object plane to an image plane: a) a first objective section having one or more first anamorphic lens elements that define a first squeeze ratio $Q_F$, wherein $1.6<Q_F<2.5$; b) a second objective section having one or more second anamorphic lens elements that define a first squeeze ratio $Q_R$, wherein $1.1<Q_R<1.6$; c) an aperture stop disposed between the first and second objective sections; and d) wherein a total squeeze ratio $Q=Q_F/Q_R$ and is in the range $1.0<Q<2.27$.

Another aspect of the disclosure is the anamorphic objective as described above, wherein $1.7<Q_F<2.0$ and $1.1<Q_R<1.5$, and wherein $1.13<Q<1.82$.

Another aspect of the disclosure is the anamorphic objective as described above, wherein $1.4 \leq Q \leq 1.6$.

Another aspect of the disclosure is the anamorphic objective as described above, wherein the second objective section comprises an objectwise lens group and an imagewise lens group, wherein the imagewise lens group includes at least one anamorphic lens element and is configured as an adapter that operably engages with the objectwise lens group.

Another aspect of the disclosure is the anamorphic objective as described above, wherein the first objective section and the objectwise lens group define a well-corrected anamorphic lens system having a first squeeze ratio $Q_{LS}$ that is greater than the total squeeze ratio Q.

An aspect of the disclosure is to provide a lens with a relatively low Q but with the anamorphic characteristics normally associated with a lens having a relatively high Q. So, in example 1 below, a 2× anamorphic lens is converted to 1.34× by means of a 1.49× rear anamorphic lens group (2/1.49=1.34). The anamorphic characteristics, such as differential depth of field and oval bokeh resemble that of a 2× anamorphic lens, and not 1.34× anamorphic lens. The reason why one would want such a low Q of 1.34× is, for example, to convert a 16:9 aspect ratio to a 2.39:1 aspect ratio. One reason why one would want pronounced anamorphic characteristics is for aesthetics that many cinematographers desire. While ordinary 1.34× anamorphic lenses exist for creating 2.39:1 output from a 16:9 sensor, they simply do not look sufficiently "anamorphic" in the minds of many cinematographers.

Thus, another aspect of the disclosure is an anamorphic objective that comprises in order from an object plane to an image plane: a) a first objective section having one or more first anamorphic lens elements and a first squeeze ratio $Q_F$; b) a second objective section having one or more second anamorphic lens elements and a second squeeze ratio $Q_R$; c) an aperture stop disposed between the first and second objective sections; and d) wherein the first squeeze ratio $Q_F$ of the first objective lens section defines at least one residual anamorphic characteristic while the first and second objective sections define a total squeeze ratio Q that is less than $Q_F$.

Another aspect of the disclosure is the anamorphic objective as described above, wherein $Q=Q_F/Q_R$.

Another aspect of the disclosure is the anamorphic objective as described above, wherein the at least one residual characteristic comprises a first amount of elliptical bokeh that is greater than a second amount of bokeh associated with the total squeeze ratio Q as if the second amount of bokeh were produced with a front anamorphic lens.

Another aspect of the disclosure is the anamorphic objective as described above, wherein the at least one residual characteristic further comprises a differential depth of field

BRIEF DESCRIPTION OF THE DRAWINGS

FIG. 1c is a pair of spot diagrams showing bokeh ellipse for Example #1 before and after de-squeezing

DETAILED DESCRIPTION

Figure 1A:
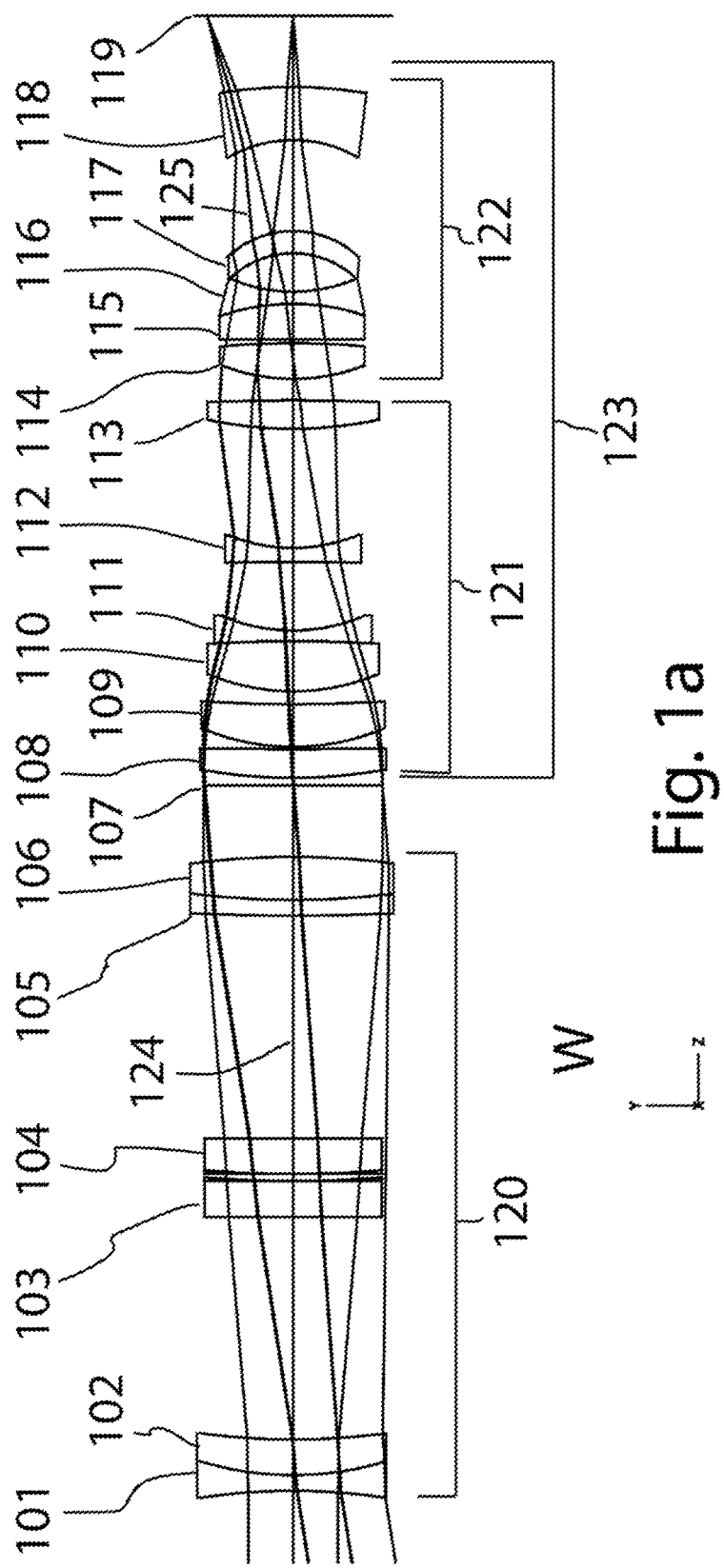
FIG. 1a is an optical layout of Example #1 in the W plane.

The claims set forth below are incorporated into and constitute part of this Detailed Description.

In the discussion below, the symbol "~" means "approximately equal to" or "substantially the same as."

Anamorphic lenses generally have two planes of symmetry, and for the purpose of analysis it is very useful to consider two portions of the lens—the first being on the object side of the aperture stop and the second being on the image side of the aperture stop. U.S. Pat. No. 8,858,099 by Dodoc et al., which is incorporated by reference herein, contains useful general language and terminology regarding anamorphic lenses, some of which will be paraphrased below. According to the invention an anamorphic objective is provided that forms an image at an image plane. This anamorphic objective has at least one first plane of symmetry and at least one second plane of symmetry, wherein the first and second planes of symmetry are perpendicular to each other. The first and second planes of symmetry intersect in a straight line that serves as an optical axis. The anamorphic objective also includes in order from an object-facing side to an image-facing side (i.e., objectwise to imagewise) at least one first objective section and at least one second objective section, with an aperture stop located between the first and second objective sections. Each of the two objective sections contains at least one anamorphic element.

The anamorphic objective according to the invention fulfills the following conditions:

$$f_T' > f_W' \quad [1]$$

$$f_T'/f_W' = Q \quad [2]$$

$$M_{CRW} > M_{CRT} \quad [3]$$

where $f_T'$ is the focal length of the anamorphic objective in the first plane of symmetry, and $f_W'$ is the focal length of the anamorphic objective in the second plane of symmetry. The first and second planes of symmetry may be referred to as simply "T" and "W", respectively. Q is the anamorphic factor, sometimes referred to as the "anamorphic squeeze ratio", or simply "squeeze ratio," as mentioned above, and exemplary ranges on Q are discussed below. Q is the squeeze ratio for the entire lens unless otherwise noted. $M_{CRW}$ is the inverse of the chief ray magnification in the W plane of the second objective section, and is given by dividing the tangent of the chief ray angle in the W plane at the image surface by the tangent of the chief ray angle in the W plane at the aperture stop surface. $M_{CRT}$ is the inverse of the chief ray magnification in the T plane of the second objective section, and is given by dividing the tangent of the chief ray angle in the T plane at the image surface by the tangent of the chief ray angle in the T plane at the aperture stop surface.

It is further useful to define the following when the aperture stop has a circular shape:

$$Q_F = y_{1X}/y_{1Y} \quad [4]$$

$$Q_R = y_{RY}/y_{RX} \quad [5]$$

Where $Q_F$ is the anamorphic factor of the first objective section, $Q_R$ is the anamorphic factor of the second objective section, $y_{1X}$ is the paraxial image height in the T plane at the lens surface closest to the object plane at the long conjugate (e.g., the first lens surface, or object-most lens surface), $y_{1Y}$ is the paraxial image height in the W plane at the lens surface closest to the object plane at the long conjugate, $y_{RX}$ is the paraxial image height in the T plane at the lens surface closest to the image plane at the short conjugate (e.g., the last lens surface, or image-most lens surface), and $y_{RY}$ is the paraxial image height in the W plane at the lens surface closest to the image plane at the short conjugate. Using these above definitions, we have the following useful relationship:

$$Q = Q_T = f_T'/f_W' = Q_F/Q_R \qquad [6]$$

In the above equation [6] for $Q=Q_T$, the ratio $Q_F/Q_R$ is equal to the ratio of the focal lengths $f_T'$ and the $f_W'$ to at least two significant digits. For more than two significant digits, it may be more appropriate to state that $Q \approx Q_F/Q_R$ due to aberrations and like system imperfections. Note also that values of Q, $Q_F$ and $Q_R$ that are "substantially equal" to a given value are in an example within +/−5% of the given value. In equation [6], the subscript "T" for $Q_T$ means "total" so that $Q_T$ or Q is the total Q value for the entire anamorphic objective.

As stated above, front anamorphic lenses, or lenses having most or all of their anamorphic effect produced by anamorphic lens elements on the object side of the aperture stop, have desirable residual anamorphic characteristics such as elliptical bokeh and differential depth of field. By contrast, rear anamorphic lenses, or lenses having most or all of their anamorphic effect produced by anamorphic lens elements on the image side of the aperture stop, do not have as much of these desirable characteristics or do not have them at all.

Since anamorphic lens elements placed on the image side of the stop can affect Q without altering residual anamorphic characteristics they can be combined with front anamorphic lens elements to produce an anamorphic lens system having a relatively small squeeze ratio (e.g., 1.344×) but with relatively pronounced anamorphic characteristics that would normally be associated with a much larger Q (e.g. in the range of 1.5× to 2.5×). The way this can be done according to the present invention is to first create a front anamorphic lens system with a relatively large Q, which will have the anticipated pronounced anamorphic characteristics. Then, anamorphic lens elements are incorporated into the second objective section in order to reduce Q while retaining most or all of the desirable anamorphic characteristics produced by the lens elements located on the object side of the aperture stop.

The need for an anamorphic lens having a Q value of 1.344 in order to transform a 16:9 aspect ratio image into 2.39:1 DCI scope output image has already been discussed above. Additional desirable Q values depend on the combination of the required aspect ratio of the final image together with the aspect ratio of the image sensor. For example, a relatively new final aspect ratio for television and streaming content is 2:1. In order to fully utilize a 16:9 sensor for 2:1 output an anamorphic lens having Q=1.125 is needed. Another example is the use of the popular Arri Alexa camera in its "open gate" mode, which has an aspect ratio of 1.55:1. In order to get 2.39 output from 1.55:1 without cropping, an anamorphic lens having Q=1.54 is needed. Similarly, in order to get 2.0 output from 1.55:1 without cropping an anamorphic lens having Q=1.29 is needed. It can even be desirable to use an anamorphic lens having Q~1.0, which, for example would leave a 16:9 image in its native 16:9 aspect ratio as final output. However, in this last case the anamorphic lens would be constructed according to the present invention in order to produce desirable anamorphic artifacts even though the net squeeze ratio Q is approximately 1.0.

According to Equation 6 above, $Q=Q_F/Q_R$. This provides an easy means for determining $Q_R$ given the required Q and desired $Q_F$ values. Thus, to get Q=1.29 when $Q_F$=1.79 we need $Q_R$=1.79/1.29=1.39. This will transform the 1.55:1 output from an Arri Alexa in open gate mode into 2:1 final aspect ratio with anamorphic artifacts normally associated with a 1.79× front anamorphic lens. Similarly, to get Q=1.54 when $Q_F$=1.79 we need $Q_R$=1.79/1.54=1.16. This will transform the 1.55:1 output from an Arri Alexa in open gate mode into 2.39:1 DCI scope final aspect ratio with anamorphic artifacts normally associated with a 1.79× front anamorphic lens.

Generally, a front anamorphic lens system will have most of its anamorphic power in the W plane of symmetry. A typical example is an afocal anamorphic reversed-Galilean attachment, which reduces the system focal length in the W plane of symmetry while having less effect, or in many cases no effect, on the system focal length in the T plane of symmetry. In such a system the image is squeezed in the W plane of symmetry. By contrast, a typical rear anamorphic lens system will have most of its anamorphic power in the T plane of symmetry. A typical example here is an anamorphic tele-extender, which increases the system focal length in the T plane of symmetry, but has less effect, or in many cases no effect, on the system focal length in the W plane of symmetry. In such a system the image is stretched in the T plane of symmetry, which is superficially similar to squeezing in the W plane of symmetry.

The anamorphic objective disclosed herein is unique and non-obvious in that although it comprises both front and rear anamorphic sections, the rear section is intentionally oriented so that it reduces the value of Q that the front section would otherwise produce. In other words, the rear section partially, or even in an extreme case fully, de-squeezes the squeezing produced by the front section. This is succinctly expressed by condition [3] above involving the chief ray magnifications in the T and W planes produced by the second objective section.

This type of arrangement is unprecedented because it is the opposite of the design approach that would be taken in order to minimize size, weight and complexity while maximizing image quality. In U.S. Pat. No. 8,858,099 by Dodoc et al. teach away from this type of arrangement, and in fact in their sole numerical example it is found that $M_{CRW} \le M_{CRT}$, which is the opposite of the condition imposed by [3]. Similarly, in U.S. Pat. No. 4,362,366 by Gottschalk the sole example teaches that the rear anamorphic group is used to reduce the power of the front anamorphic group for a given Q in order to minimize size and weight, and as a result $M_{CRW} \le M_{CRT}$.

As a special case, it is especially useful to incorporate the anamorphic lens elements behind the stop as an independently well-corrected anamorphic focal length extender. Anamorphic focal length extenders of this type are described in U.S. Pat. No. 2,933,017 by Kingslake et al, in U.S. Pat. No. 6,995,920 by Nurishi, and in U.S. Pat. No. 7,085,066 by Neil. This anamorphic extender can then function as a removable attachment in combination with an independently well-corrected front anamorphic lens. In this case, however, the rear extender attachment is oriented orthogonally to its normal position, so that it stretches the image horizontally instead of vertically. The front anamorphic lens can then be used by itself when a large squeeze factor is needed, such as shooting for 2.39:1 Scope output with a 4:3 sensor. The lens can then be converted to a small squeeze factor by fitting the rear anamorphic attachment. By orienting the principle anamorphic plane of the attachment so that it is coplanar with the principle anamorphic plane of the front anamorphic lens the attachment has the effect of partially or fully stretching out the image in the same direction that it was squeezed by the front anamorphic lens.

Figure 5:
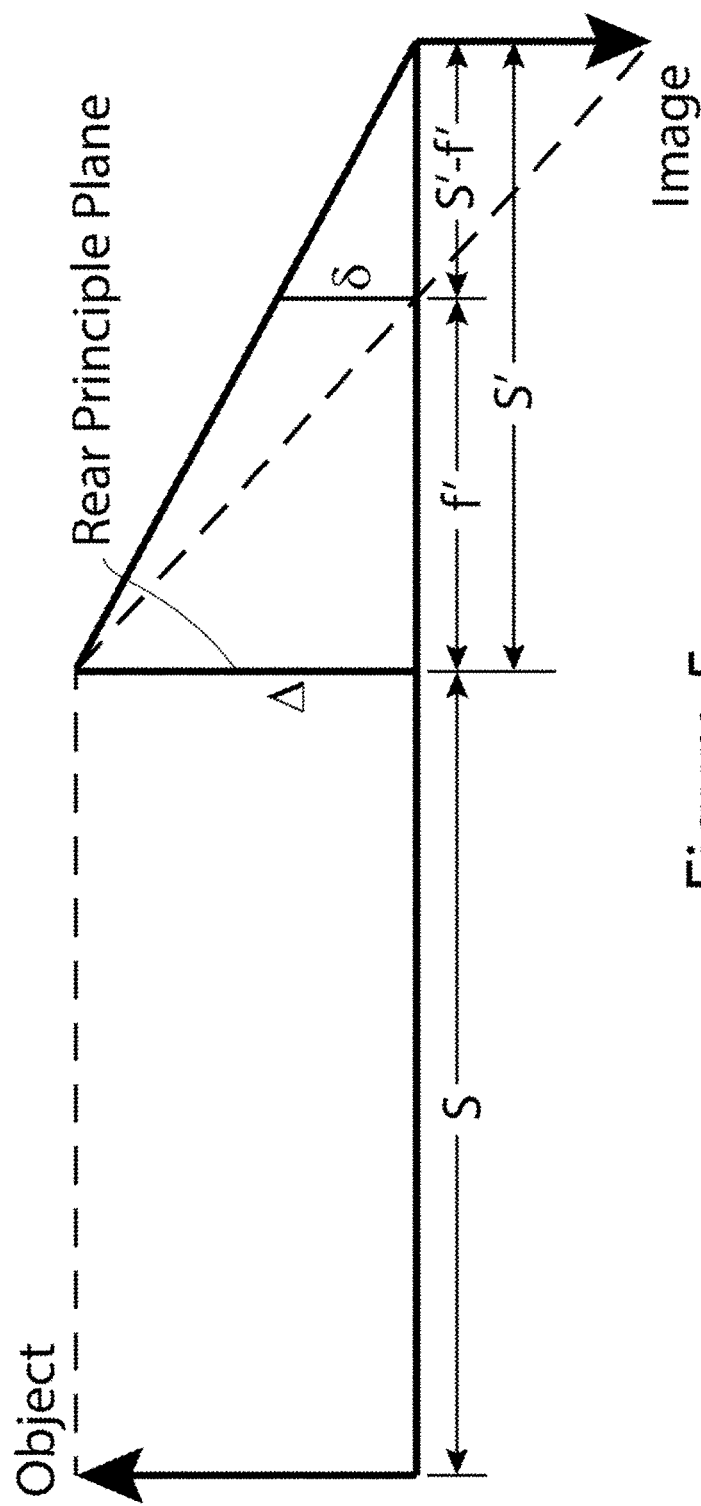
FIG. 5 is a paraxial layout showing key parameters.

To understand why front and rear anamorphic lenses behave in such a different manner, first consider the case of a classical front anamorphic lens system comprising an afocal reversed-Galilean anamorphic front section and a spherical rear objective in which the aperture stop is located with the rear objective. Since the aperture stop is circular and is completely filled with light at least on-axis the f-number is the same for both the W and T planes. FIG. 5 illustrates several key parameters related to paraxial image formation. $\Delta$ is the height of the paraxial marginal ray at the paraxial lens. f' is the focal length of the paraxial lens. S and S' are the object and image distances, respectively. $\delta$ is the blur radius when the image of an object at S is examined at the infinity focal plane f' instead of at S'. For an anamorphic lens, the quantities $\Delta$, $\delta$, and f' generally all have different values in the W and T planes, and will be referred to as $\Delta_W$, $\Delta_T$, $\delta_W$, $\delta_T$, $f_W'$ and $f_T'$, respectively. Referring to FIG. 5, $$\Delta_T/\Delta_W = Q \quad [7]$$

By similar triangles, $$\delta/(S'-f') = \Delta/S', \quad [8]$$

or, $$\delta = \Delta(1-f'/S') \quad [9]$$

From the well-known Gaussian image equation, $$S' = f'S/(S+f') \quad [10]$$

Combining [6] and [7] we get:

$$\delta = -\Delta f'/S \quad [11]$$

Splitting [8] into separate portions for the T and W planes:

$$\delta_T = -\Delta_T f_T'/S \quad [12]$$

and $$\delta_W = -\Delta_W f_W'/S \quad [13]$$

From [2], [4] and [10] we get:

$$\delta_W = -(\Delta T/Q)(f_T'/SQ) \quad [14]$$

or, $$\delta_W = -(\Delta_T f_T')/(SQ^2) \quad [15]$$

and from [9] and [12] we get:

$$\delta_W/\delta_T = 1/Q^2 \quad [16]$$

Since $\delta_W$ is the amount of defocus blur in the W plane and $\delta_T$ is the amount of defocus blur in the T plane, the quotient $\delta_W/\delta_T$ describes the aspect ratio of the defocus ellipse formed by a front anamorphic lens system. For example, if Q is 2, then the defocus ellipse will have an aspect ratio of 4:1 at the image plane. After de-squeezing by the required value of 2, the defocused highlights will have a residual elliptical shape with an aspect ratio of 2:1.

A similar analysis can be done for a rear anamorphic lens system. However, in this case the f-number is not held constant in the T and W planes, and as a result:

$$\Delta_T/\Delta_W = 1 \quad [17]$$

After going through the same derivation as above using [14] instead of [4] we get:

$$\delta_W/\delta_T = 1/Q \quad [18]$$

Thus, if Q=2 the defocus ellipse will have an aspect ratio of 2, and after de-squeezing by the required value of 2 the defocused highlights will have a residual circular shape with an aspect ratio of 1:1.

Front anamorphics are ordinarily more powered in horizontal direction, and reduce focal length/increase FOV in that direction. Rear anamorphics are ordinarily more powered in vertical direction, and they increase EFL and reduce FOV in that direction. So the idea is to take the desirable characteristics of front anamorph and then reduce the squeeze ratio with a rear anamorph having more power in the horizontal direction—same direction as front. Since the rear anamorph doesn't alter the characteristics of the front anamorph, the characteristics are preserved while the overall squeeze ratio is reduced as desired. For example, a 1.79× front anamorphic objective combined with coplanar 1.33× rear will yield a net 1.344× anamorph having bokeh and DOF characteristics of a 1.79× anamorph. This same 1.344× anamorph can be used on 4:3 sensor to produce 16.128:9 output which only requires minor trimming to produce true 16:9 output with full 1.79× anamorph characteristics.

DESIGN EXAMPLES

Four detailed design examples are provided below which, together with the specification in this application, provide sufficient information to allow one skilled in the art of lens design to practice the invention. These examples do not limit the scope of the invention. In particular, all four examples utilize anamorphic elements in the second objective section which are cylinders having zero power in the T plane. However, more complex systems utilizing anamorphic lens elements with power in both the T and W planes may be used. Similar comments apply to the anamorphic elements in the first objective section.

An important aspect of anamorphic lens design is the technique used for focusing. Several techniques are illustrated in the Examples given below. One technique is to place a focusing objective behind a substantially afocal front anamorphic group, and simultaneously place a Stokes lens within the anamorphic group in order to eliminate the astigmatism generated when the objective is focused on a closer or further object. A Stokes lens comprises a pair of weak cylindrical elements with similar but opposite optical power, and their cylindrical axes are clocked at 45-degrees with respect to the W plane. During focusing, this pair of weak cylindrical elements are counter-rotated as the focusing group 121 is moved along the optical axis 124 in order to ensure that the foci in both the W and T planes always coincide. The focusing objective can either be a lens that is moved in its entirety to-and-fro along the optical axis, or it can have internal lens groups that change their relative position during focusing. Example 4 has a focusing objective of this latter type, in which a small internal lens group moves for focusing while the remainder of the focusing objective remains stationary.

A second focusing technique involves a so-called variable diopter placed in the front of the lens system. A variable diopter comprises at least two groups of lens elements with substantially equal and opposite optical power. When these two groups of elements are close together the combination has little or no optical power, and the entire lens system is then focused at infinity. When the two groups of elements are moved apart the light from a close object is collimated after exiting the variable diopter system. In its simplest form, a variable diopter system comprises two lens elements, one with negative power and the other with positive power.

Example 1

Figure 1B:
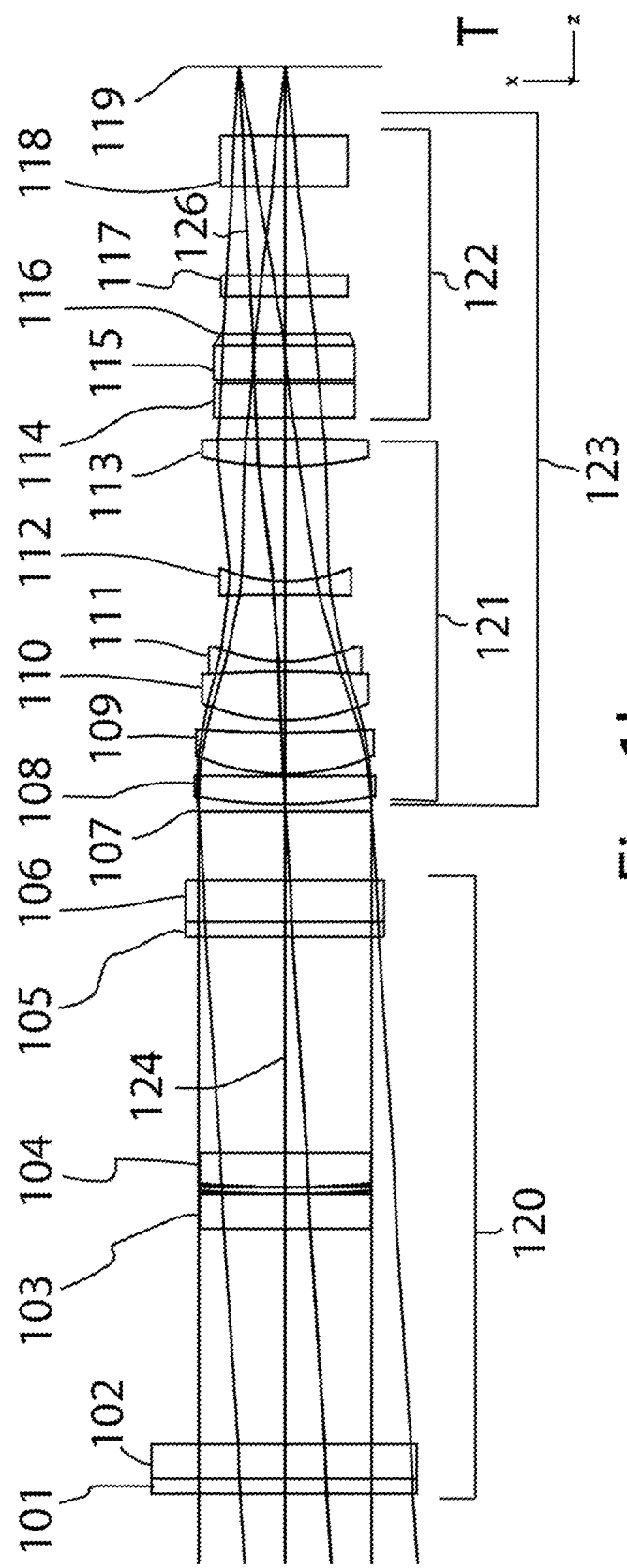
FIG. 1b is an optical layout of Example #1 in the T plane.

FIG. 1a is a layout of Example 1 of the present disclosure in its W plane. FIG. 1b is a layout of Example 1 in its T plane. Example 1 comprises, in order from an object side to an image side (i.e., objectwise to imagewise), a substantially afocal anamorphic group 120, a spherical focusing group 121, and a second anamorphic group 122. The aperture stop 107 lies in between the first objective section 120 and the second objective section 123. The anamorphic group 120 together with the aperture stop 107 and the focusing group 121 form an independently well-corrected anamorphic lens system having a squeeze ratio $Q_{LS}$ that is greater than the total squeeze ratio Q. The focusing group 121 has a focal length of 100 mm, and the anamorphic group 120 has a magnification of 0.5× in the W plane and 1.0× in the T plane. Therefore, the anamorphic lens system comprising 120 together with 107 and 121 has a focal length $f_T'$ in the T plane of 100 mm and a focal length $f_W'$ in the W plane of 50 mm. The anamorphic factor of the first objective section, $Q_F$, is 2.0.

The second anamorphic group 122 is a rear anamorphic group. In an example, the second anamorphic group can be configured as an adapter that attaches to the spherical focusing group 121. In the example design, the rear anamorphic group has a magnification of 1.488× in the W plane and 1.0× in the T plane. So, the net focal length $f_W'$ in the W plane is 50 mm×1.488=74.4 mm, and the net focal length $f_T'$ in the T plane is 100 mm×1.00=100 mm. The anamorphic factor of the second objective section, $Q_R$, is 1.488. The net anamorphic factor, $Q_T$, is thus 100/74.4=1.344, which is the desired value to produce 2.39 DCI Scope output from a 16:9 image. Since the lens portion comprising 120 together with 107 and 121 is a front anamorphic system with Q=2.0, the system as a whole has a net Q value, $Q_T$, of 1.344 with anamorphic artifacts ordinarily associated with Q~2.0 front anamorphic lens systems, as illustrated in FIG. 1c. When used as an adapter, the second anamorphic group can be used to transform a 2× front anamorphic lens (as defined by lens groups 120 and 121) into a 1.34× anamorphic lens (as defined by lens groups 120, 121 and 122) while retaining desirable 2× anamorphic characteristics for cinemagraphic purposes.

The substantially afocal anamorphic group 120 comprises six anamorphic elements 101 through 106. Pairs of anamorphic elements 101 and 102; and 105 and 106 are cemented together to form anamorphic cemented doublets. Elements 103 and 104 together form a Stokes lens. Elements 103 and 104 are each weak cylindrical elements with similar but opposite optical power, and their cylindrical axes are clocked at 45-degrees with respect to the W plane. During focusing, Elements 103 and 104 are counter-rotated as the focusing group 121 is moved along the optical axis 124 in order to ensure that the foci in both the W and T planes always coincide. The counter-rotation angle will be referred to below as the astigmatizer rotation angle, $\theta_A$. Note that $\theta_A$ is a counter-rotation angle superimposed on the astigmatizer axis clocking angle of 45-degrees.

Detailed prescription data for Example 1 for an object at infinity is given in Table 1a below. Focusing and specification data for Example 1 are given in Tables 1b and 1c below. Note that in Table 1b T0, T16 and T28 are thicknesses in millimeters.

TABLE 1a

Prescription Data for Example 1

| Surf | Type | Radius_Y | Radius_X | Thickness | Glass |
| --- | --- | --- | --- | --- | --- |
| OBJ | STANDARD | Infinity | Infinity | Infinity | |
| 1 | STANDARD | Infinity | Infinity | 10 | |
| 2 | TOROIDAL | −86.77864 | Infinity | 2.2 | H-LAF1 |
| 3 | TOROIDAL | 44.52907 | Infinity | 5 | S-TIH53 |
| 4 | TOROIDAL | 99.34995 | Infinity | 31.06918 | |
| 5 | COORDBRK | — | — | 0 | |
| 6 | COORDBRK | — | — | 0 | |
| 7 | STANDARD | Infinity | Infinity | 5 | S-BSL7 |
| 8 | TOROIDAL | 300 | Infinity | 1 | |
| 9 | COORDBRK | — | — | 0 | |
| 10 | TOROIDAL | 300 | Infinity | 5 | S-BSL7 |
| 11 | STANDARD | Infinity | Infinity | 31.06918 | |
| 12 | COORDBRK | — | — | 0 | |
| 13 | COORDBRK | — | — | 0 | |
| 14 | TOROIDAL | 318.4629 | Infinity | 2.2 | H-ZF13 |
| 15 | TOROIDAL | 116.4609 | Infinity | 6 | H-ZK9B |
| 16 | TOROIDAL | −110.8708 | Infinity | 10 | |
| STO | STANDARD | Infinity | Infinity | 1 | |
| 18 | STANDARD | 75.49876 | 75.49876 | 4 | S-BSL7 |
| 19 | STANDARD | 1081.09 | 1081.09 | 0.3 | |
| 20 | STANDARD | 32.13625 | 32.13625 | 6 | S-FPL51 |
| 21 | STANDARD | 202.6771 | 202.6771 | 1.810351 | |
| 22 | STANDARD | 30.98362 | 30.98362 | 7 | S-BSL7 |
| 23 | STANDARD | −183.3829 | −183.3829 | 1.5 | S-NBH5 |
| 24 | STANDARD | 25.02576 | 25.02576 | 9.566198 | |
| 25 | STANDARD | −636.0562 | −636.0562 | 2 | S-NBM51 |
| 26 | STANDARD | 24.27454 | 24.27454 | 16.55664 | |
| 27 | STANDARD | 56.04878 | 56.04878 | 4 | S-LAH51 |
| 28 | STANDARD | −294.8117 | −294.8117 | 3 | |
| 29 | TOROIDAL | 27.30162 | Infinity | 5 | S-FSL5 |
| 30 | TOROIDAL | −109.6348 | Infinity | 0.5 | |
| 31 | TOROIDAL | Infinity | Infinity | 5 | S-NBH51 |
| 32 | TOROIDAL | −31.05614 | Infinity | 1.7 | S-LAL8 |
| 33 | TOROIDAL | 22.18819 | Infinity | 5.375784 | |
| 34 | TOROIDAL | −12.73357 | Infinity | 3 | S-FSL5 |
| 35 | TOROIDAL | −13.67299 | Infinity | 12.76714 | |
| 36 | TOROIDAL | −17.89293 | Infinity | 7.407183 | S-LAH66 |
| 37 | TOROIDAL | −60.23101 | Infinity | 10 | |
| IMA | STANDARD | Infinity | Infinity | | |

TABLE 1b

Focusing Data for Example 1

| Object Dist., T0 | T16 | T28 | $\theta_A$ |
| --- | --- | --- | --- |
| Infinity | 10.000 | 3.000 | 0.00 deg. |
| 990 | 4.942 | 8.058 | −7.73 deg. |

TABLE 1c

Specification Data for Example 1
EXAMPLE 1 - SPECIFICATIONS

| | |
| --- | --- |
| Focal Length in T Plane, $f_T'$ | 100.000 mm |
| Focal Length in W Plane, $f_W'$ | 74.384 mm |
| First Objective Section Anamorphic Factor, QF | 2.000 |
| Second Objective Section Anamorphic Factor, QR | 1.488 |
| Net Anamorphic Factor, QT | 1.344 |
| $M_{CRW}$ | 3.702 |
| $M_{CRT}$ | 0.900 |
| Image Width (W-Plane) | 24.00 mm |
| Image Height (T-Plane) | 13.5 mm |

Example 2

Figure 2A:
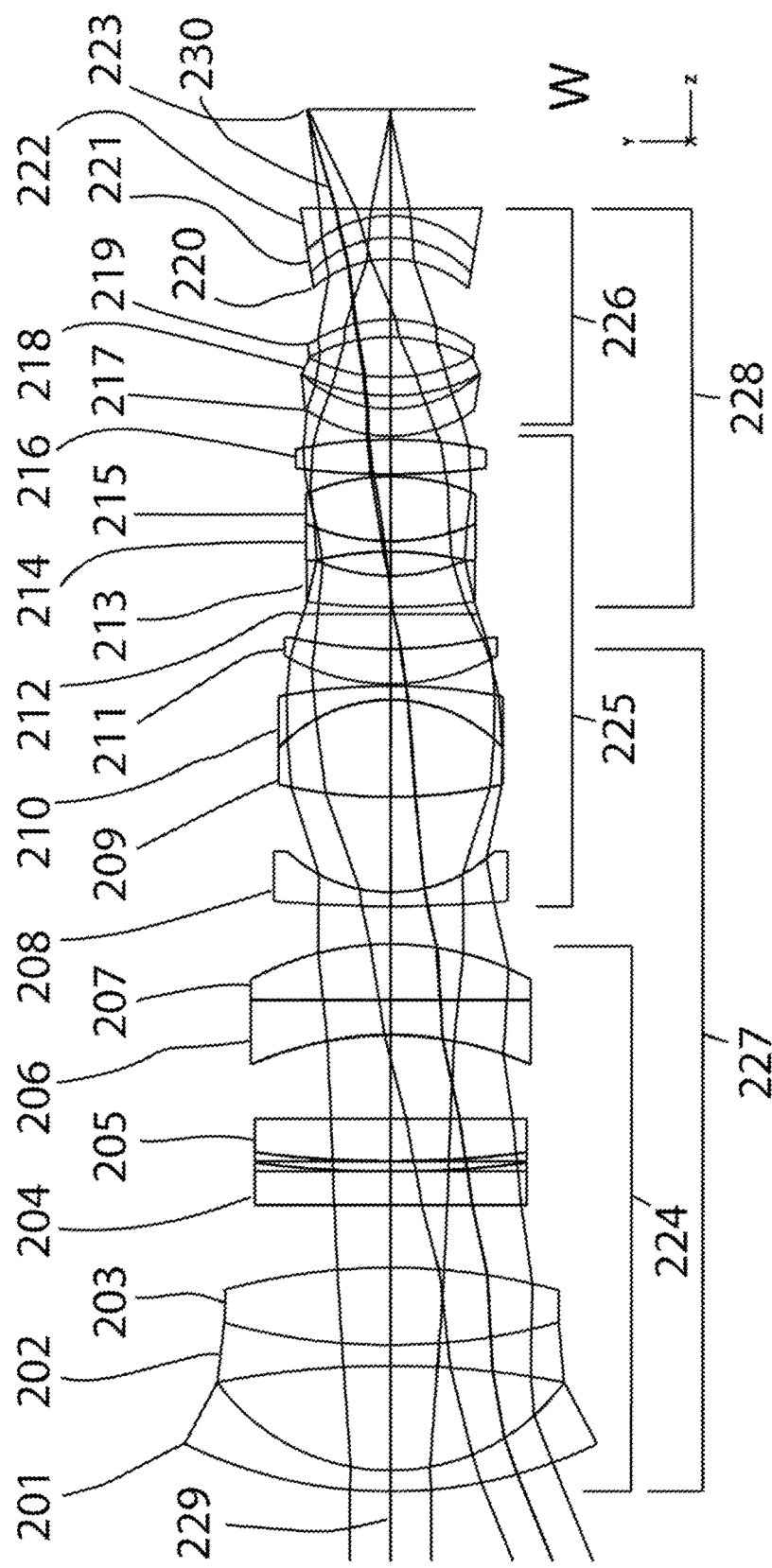
FIG. 2a is an optical layout of Example #2 in the W plane.
Figure 2B:
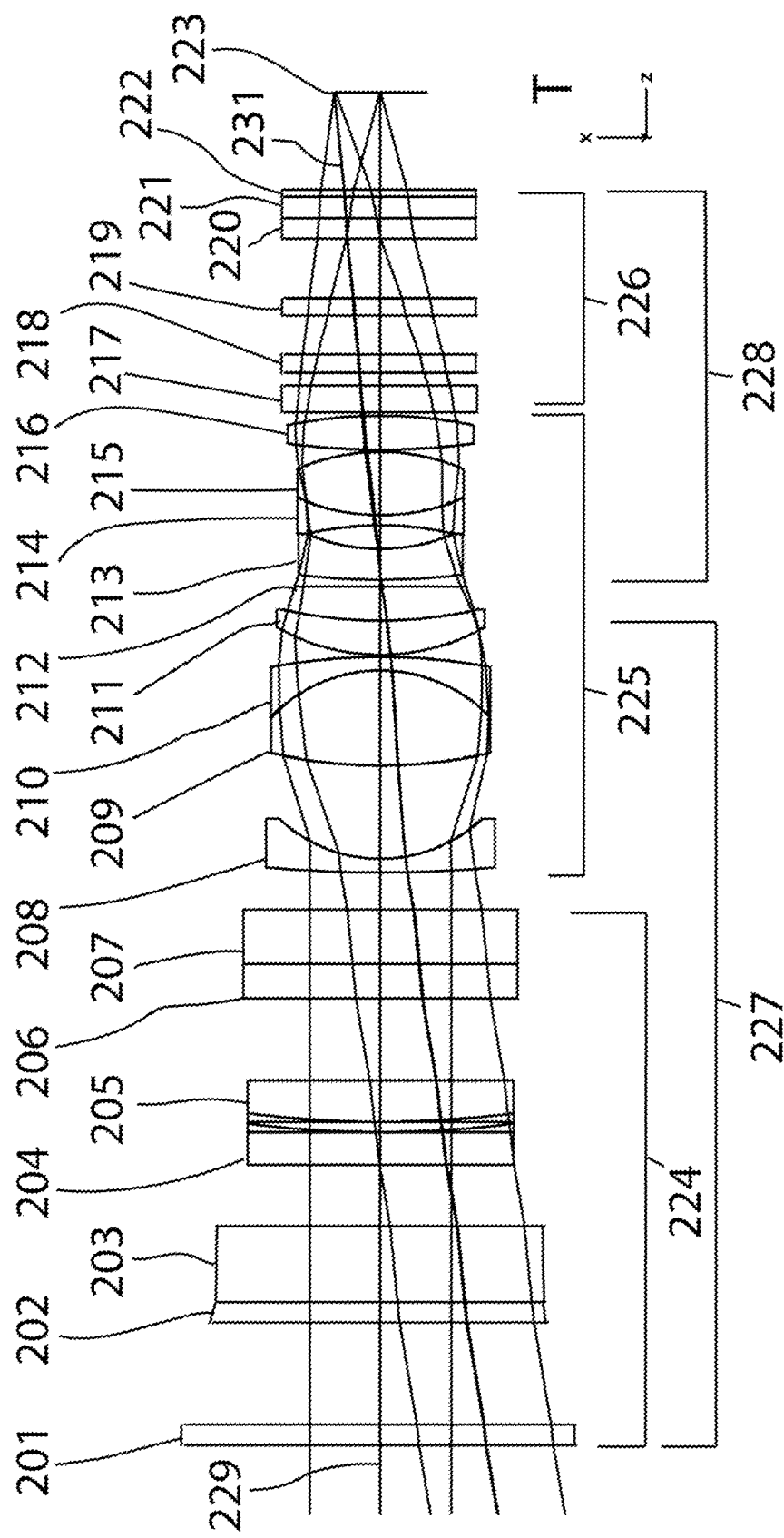
FIG. 2b is an optical layout of Example #2 in the T plane.

FIG. 2a is a layout of Example 2 of the present disclosure in its W plane. FIG. 2b is a layout of Example 2 in its T plane. Example 2 comprises, in order from an object side to an image side, a substantially afocal anamorphic group 224, a spherical focusing group 225, and a second anamorphic group 226. The aperture stop 212 lies in between the first objective section 227 and the second objective section 228. The anamorphic group 224 together with the focusing group 225 form an independently well-corrected anamorphic lens system having a squeeze ratio $Q_{LS}$ that is greater than the total squeeze ratio Q. Note that the aperture stop 212 lies within the spherical focusing group 225. The focusing group 225 has a focal length of 40 mm, and the anamorphic group 224 has a magnification of 0.56× in the W plane and 1.0× in the T plane. The anamorphic lens system comprising 224 together with 225 has a focal length $f_T'$ in the T plane of 40 mm and a focal length $f_W'$ in the W plane of 22.3 mm. The anamorphic factor of the first objective section, $Q_F$, is 1.79.

Figure 2C:
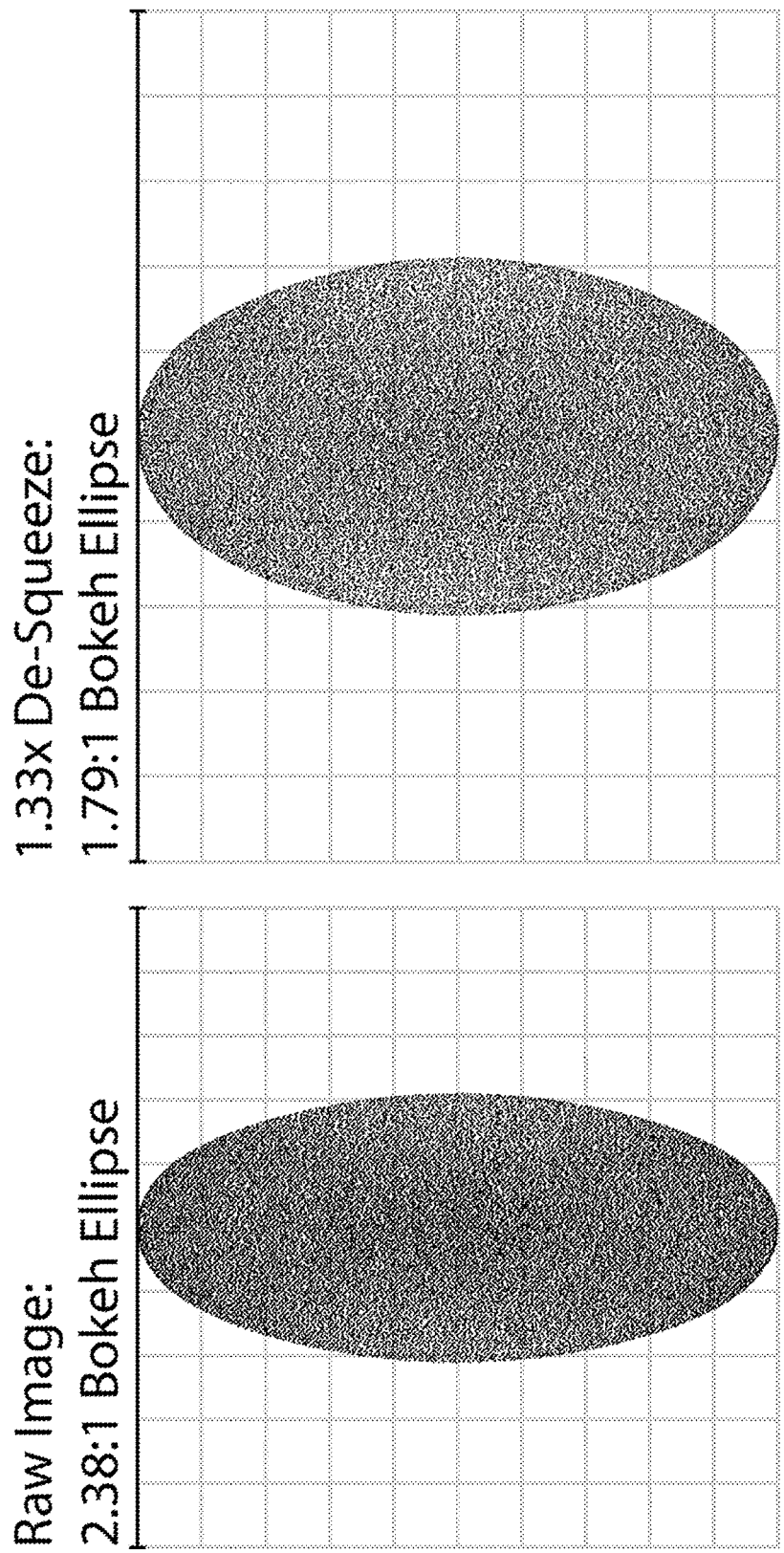
FIG. 2c is a pair of spot diagrams showing bokeh ellipse for Example #2 before and after de-squeezing

The second anamorphic group 226 is a rear anamorphic group that has a magnification of 1.35× in the W plane and 1.0× in the T plane. In an example, the second anamorphic group 226 can be configured as an adapter that attaches to the spherical focusing group 225. The net focal length $f_W'$ in the W plane is 22.3 mm×1.35=30 mm, and the net focal length $f_T'$ in the T plane is 40 mm×1.00=40 mm. The anamorphic factor of the second objective section, $Q_R$, is 1.35. The net anamorphic factor, $Q_T$, is thus 40/30=1.33, which is very close to the desired value to produce 2.39 DCI Scope output from a 16:9 image. However, since the lens portion comprising 224 together with 225 is a front anamorphic system with Q=1.79, the system as a whole has a Q value of 1.33 with anamorphic artifacts ordinarily associated with Q~1.79 front anamorphic lens systems, as illustrated in FIG. 2c.

The substantially afocal anamorphic group 224 comprises seven anamorphic elements 201 through 207. Pairs of anamorphic elements 202 and 203; and 206 and 207 are cemented together to form anamorphic cemented doublets. Elements 204 and 205 together form a Stokes lens. Elements 204 and 205 are each weak cylindrical elements with similar but opposite optical power, and their cylindrical axes are clocked at 45-degrees with respect to the W plane. During focusing, Elements 204 and 205 are counter-rotated as the focusing group 225 is moved along the optical axis 229 in order to ensure that the foci in both the W and T planes always coincide. As in Example 1, $\theta_A$ is a counter-rotation angle superimposed on the astigmatizer axis clocking angle of 45-degrees. Note that although the counter-rotation angle has a sinusoidal functional dependence on object distance, this can be accurately approximated as a linear dependence as long as the maximum counter rotation angle is relatively small. This is ensured by keeping the astigmatizer optical power sufficiently large and/or keeping the minimum object distance sufficiently large. If a small minimum object distance is desired then it may be necessary to increase the power of the individual astigmatizers in order to maintain a sufficiently linear relationship between object distance and counter rotation angle. Establishing such a linear relationship is important for making the mechanical linkage between the focus group motion and astigmatizer counter-rotation motion as simple and robust as possible.

The anamorphic group 224 is particularly well suited for both wide angle and narrower field of view anamorphic lens systems. The arrangement of the anamorphic doublets 202 and 203; and 206 and 207 offers considerable economy in manufacture as well as excellent aberration correction. Element 201 which is a negative-powered meniscus element toward the image surface in the W plane is very effective in keeping distortion reasonably well corrected.

Detailed prescription data for Example 2 for an object at infinity is given in Table 2a below. Focusing and specification data for Example 2 are given in Tables 2b and 2c below. Note that in Table 2b T0, T17 and T32 are thicknesses in millimeters.

TABLE 2a

Prescription Data for Example 2

| Surf | Type | Radius y | Radius X | Thickness | Glass |
|---|---|---|---|---|---|
| OBJ | STANDARD | Infinity | Infinity | Infinity | |
| 1 | TOROIDAL | 67.16196 | Infinity | 3 | S-LAL8 |
| 2 | TOROIDAL | 30.65374 | Infinity | 15 | |
| 3 | TOROIDAL | −131.7981 | Infinity | 3 | S-LAL8 |
| 4 | TOROIDAL | 90.40308 | Infinity | 11 | S-TIH1 |
| 5 | TOROIDAL | −90.40308 | Infinity | 9 | |
| 6 | COORDBRK | — | — | 0 | |
| 7 | COORDBRK | — | — | 0 | |
| 8 | STANDARD | Infinity | Infinity | 4.8 | H-K9L |
| 9 | TOROIDAL | 300 | Infinity | 1.5 | |
| 10 | COORDBRK | — | — | 0 | |
| 11 | TOROIDAL | 303.5 | Infinity | 6 | H-K9L |
| 12 | STANDARD | Infinity | Infinity | 12 | |
| 13 | COORDBRK | — | — | 0 | |
| 14 | COORDBRK | — | — | 0 | |
| 15 | TOROIDAL | −49.99871 | Infinity | 5 | S-TIH1 |
| 16 | TOROIDAL | Infinity | Infinity | 8 | S-LAL8 |
| 17 | TOROIDAL | −41.98684 | Infinity | 5.437676 | |
| 18 | STANDARD | 186.4312 | 186.4312 | 2 | S-BAL3 |
| 19 | STANDARD | 21.63848 | 21.63848 | 13.67455 | |
| 20 | STANDARD | 73.48046 | 73.48046 | 13.82183 | S-LAH66 |
| 21 | STANDARD | −22.1259 | −22.1259 | 2 | S-BSM18 |
| 22 | STANDARD | −86.1811 | −86.1811 | 0.3 | |
| 23 | STANDARD | 30.37299 | 30.37299 | 5 | S-LAH66 |
| 24 | STANDARD | 62.08122 | 62.08122 | 5 | |
| STO | STANDARD | Infinity | Infinity | 1 | |
| 26 | STANDARD | 95.98408 | 95.98408 | 4.5 | S-TIH6 |
| 27 | STANDARD | 27.16677 | 27.16677 | 3.457194 | |
| 28 | STANDARD | −46.95757 | −46.95757 | 1.5 | S-NBH8 |
| 29 | STANDARD | 30.67079 | 30.67079 | 9.2 | S-FPL51 |
| 30 | STANDARD | −30.05174 | −30.05174 | 0.3 | |
| 31 | STANDARD | 102.6662 | 102.6662 | 5 | S-LAH59 |
| 32 | STANDARD | −65.66878 | −65.66878 | 0.5 | |
| 33 | TOROIDAL | 21.10246 | Infinity | 3.910433 | S-LAH66 |
| 34 | TOROIDAL | 18.82219 | Infinity | 1.861658 | |
| 35 | TOROIDAL | 27.67796 | Infinity | 2.681092 | S-FPL51 |
| 36 | TOROIDAL | 25.94042 | Infinity | 5.732864 | |
| 37 | TOROIDAL | −24.87157 | Infinity | 2.5 | S-LAH66 |
| 38 | TOROIDAL | −21.17806 | Infinity | 8.666861 | |
| 39 | TOROIDAL | −16.85347 | Infinity | 3 | S-LAH66 |
| 40 | TOROIDAL | −15.65407 | Infinity | 3.116995 | S-LAH58 |
| 41 | TOROIDAL | −17.06576 | Infinity | 1 | FSL5 |
| 42 | TOROIDAL | 750.3272 | Infinity | 14.3 | |
| IMA | STANDARD | Infinity | | | |

TABLE 2b

Focusing Data for Example 2

| Object Dist., T0 | T17 | T32 | $\theta_A$ |
|---|---|---|---|
| Infinity | 5.438 | 0.500 | 0.00 deg. |
| 1959 | 5.028 | 0.910 | −3.58 deg. |
| 418.6 | 3.548 | 2.390 | −15.60 deg. |

TABLE 2c

Specification Data for Example 2
EXAMPLE 2 - SPECIFICATIONS

| | |
|---|---|
| Focal Length in T Plane, $f_T'$ | 40.0 mm |
| Focal Length in W Plane, $f_W'$ | 30.0 mm |
| First Objective Section Anamorphic Factor, $Q_F$ | 1.79 |
| Second Objective Section Anamorphic Factor, $Q_R$ | 1.35 |
| Net Anamorphic Factor, $Q_T$ | 1.33 |
| $M_{CRW}$ | 1.375 |
| $M_{CRT}$ | 0.635 |
| Image Width (W-Plane) | 24.00 mm |
| Image Height (T-Plane) | 13.5 mm |

Example 3

Figure 3A:
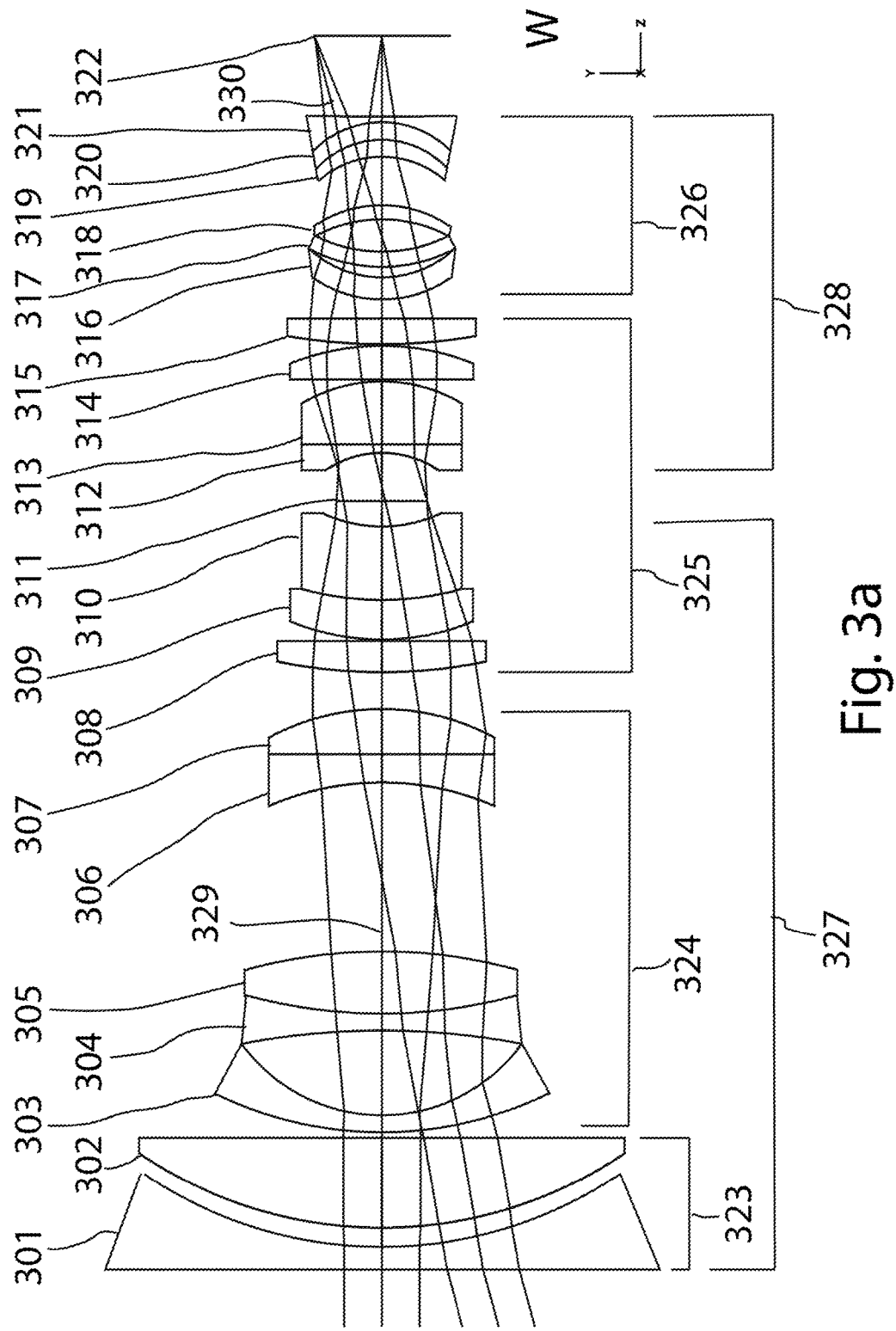
FIG. 3a is an optical layout of Example #3 in the W plane.
Figure 3B:
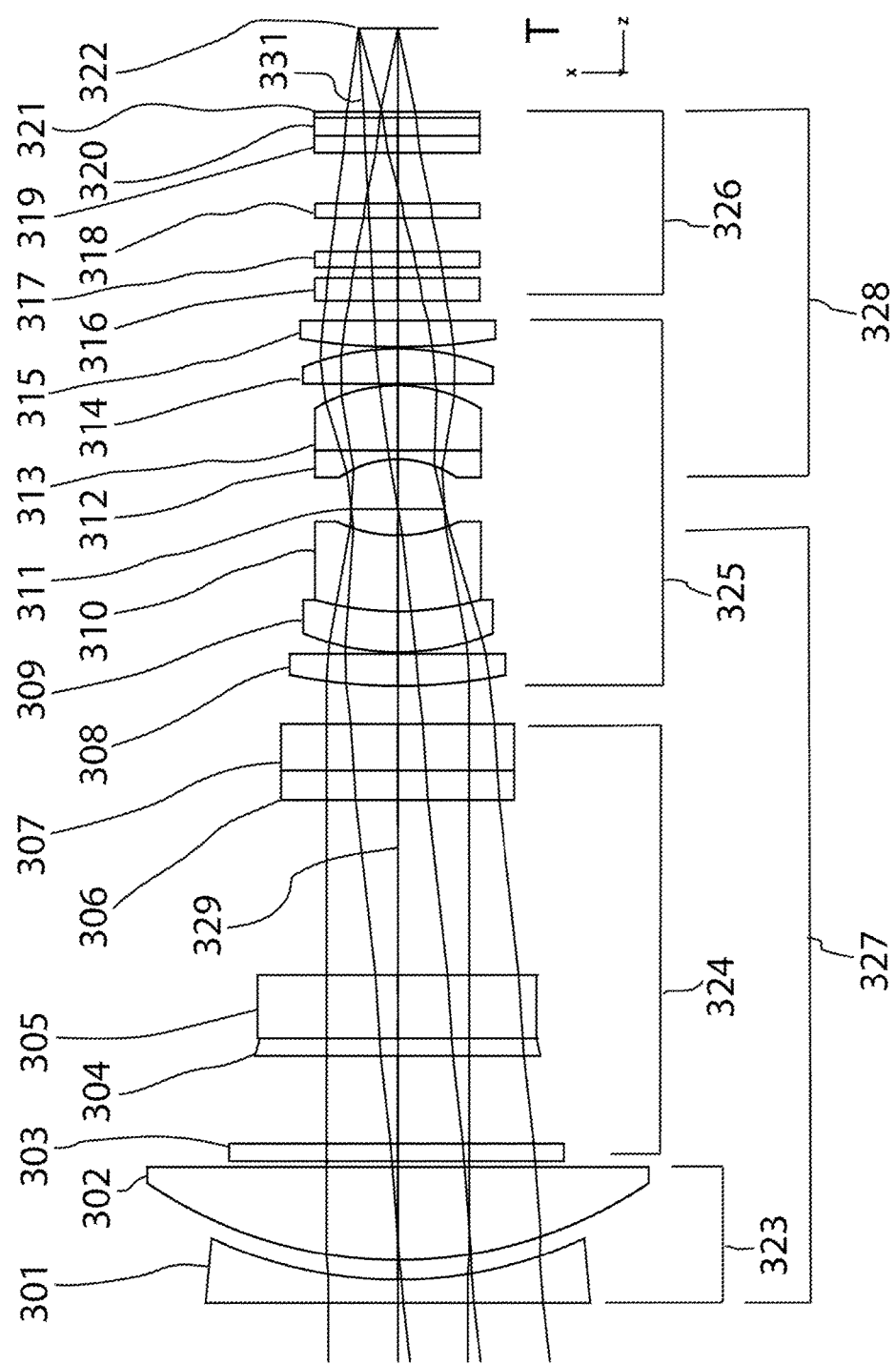
FIG. 3b is an optical layout of Example #3 in the T plane.

FIG. 3a is a layout of Example 3 of the present disclosure in its W plane. FIG. 3b is a layout of Example 3 in its T plane. Example 3 comprises, in order from an object side to an image side, a variable diopter focusing group 323, a substantially afocal anamorphic group 324, a spherical objective 325, and a second anamorphic group 326. The aperture stop 311 lies in between the first objective section 327 and the second objective section 328, and is incorporated within the spherical objective 325. The variable diopter focusing group 323 together with the anamorphic group 324 and the spherical objective 325 form an independently well-corrected anamorphic lens system having a squeeze ratio $Q_{LS}$ that is greater than the total squeeze ratio Q. The objective 325 has a focal length of 60 mm, and the anamorphic group 324 has a magnification of 0.56× in the W plane and 1.0× in the T plane. The anamorphic lens system comprising 323 together with 324 and 325 has a focal length $f_T'$ in the T plane of 59.2 mm and a focal length $f_W'$ in the W plane of 33.1 mm. The reason that $f_T'$=59.2 instead of 60 mm is that the two elements of the focus group 323 are separated slightly to allow for mechanical mounting, and as a result 323 acts as a very weak focal reducing front attachment when it is in its infinity focus position. The anamorphic factor of the first objective section, $Q_F$, is 1.79.

Figure 3C:
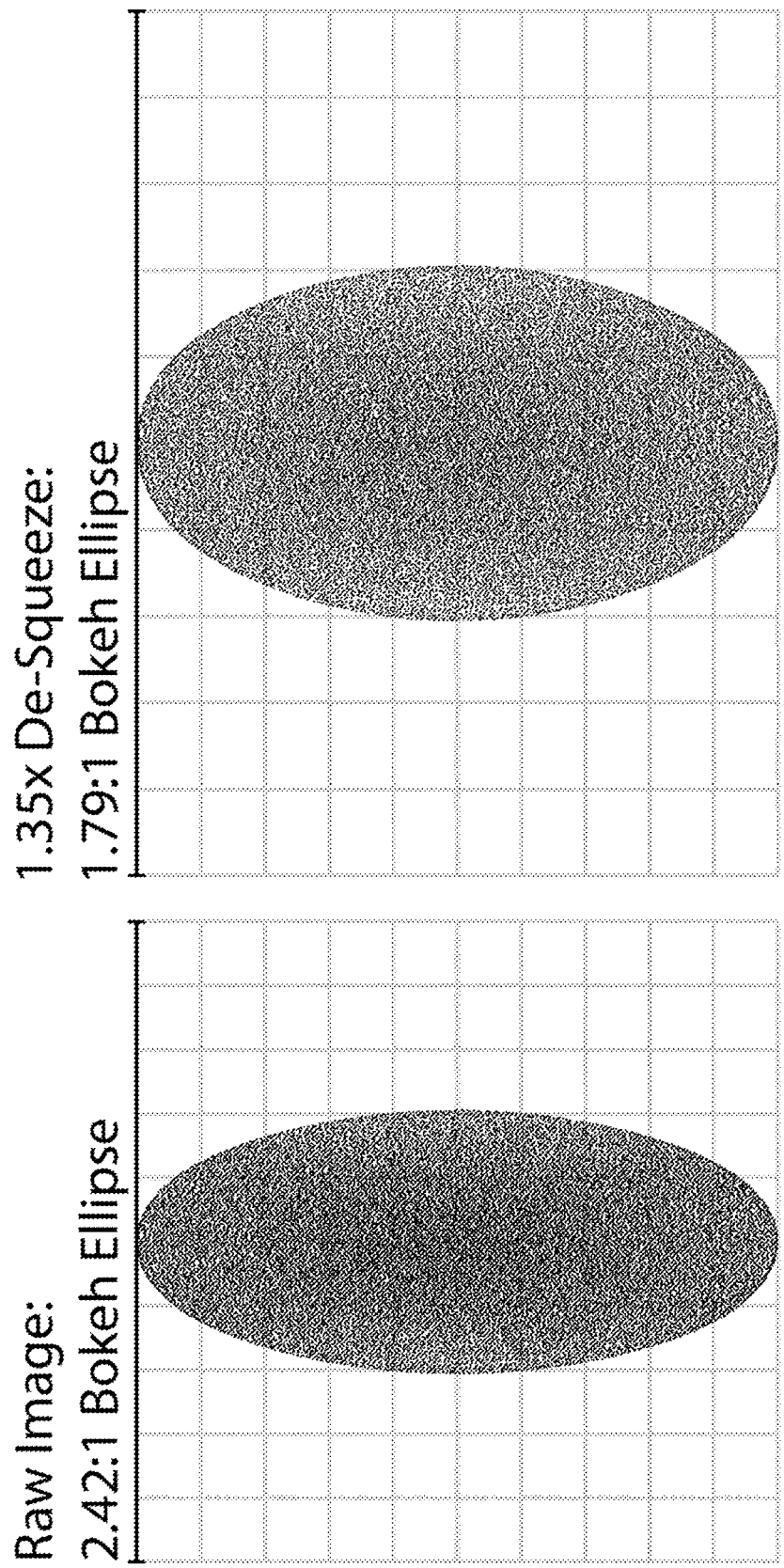
FIG. 3c is a pair of spot diagrams showing a bokeh ellipse for Example #3 before and after de-squeezing

The second anamorphic group 326 is a rear anamorphic group that has a magnification of 1.35× in the W plane and 1.0× in the T plane. In an example, the second anamorphic group 326 can be configured as an adapter that attaches to the spherical objective 325. The net focal length $f_W'$ in the W plane is 1.35×33.1=44.7 mm, and the net focal length $f_T'$ in the T plane is 59.2 mm×1.00=59.2 mm. The net anamorphic factor, $Q_T$, is thus 59.2/44.7=1.33, which is very close to the desired value to produce 2.39 DCI Scope output from a 16:9 image. However, since the lens portion comprising 323 together with 324 and 325 is a front anamorphic system with Q=1.79, the system as a whole has a $Q_T$ value of 1.33 with anamorphic artifacts ordinarily associated with Q~1.79 front anamorphic lens systems, as illustrated in FIG. 3c. The anamorphic factor of the second objective section, $Q_R$, is 1.35.

The substantially afocal anamorphic group 324 comprises five anamorphic elements 303 through 307. Pairs of anamorphic elements 304 and 305; and 306 and 307 are cemented together to form anamorphic cemented doublets. The anamorphic group 324 is derived from the anamorphic group 224 in Example 2, in which the Stokes lens has been removed and the resulting large air gap between Elements 203 and 206 has been reduced somewhat in order to maintain an afocal condition for the resulting anamorphic group 324. Lens Elements 201, 202, 203, 206 and 207 are identical to Elements 303, 304, 305, 306 and 307, respectively.

The spherical focusing group 323 together with the anamorphic group 324 forms a useful afocal front anamorphic adapter with single-focusing capability. "Single-focusing" in this context means that only one element or group of elements needs to be moved during focusing, which results in a relatively simple opto-mechanical system. In this case, when focusing from a distant to a close object the spherical lens element 301 is moved toward the object while the rest of the system is stationary. By moving Element 301 the ray bundles exiting Element 307 are always collimated regardless of object distance. As a result the system comprising 323 and 324 can be attached to a wide variety of objective lenses to form a complete anamorphic lens system. The large size of elements 301 and 302 together with the excellent wide-angle capability of the anamorphic group 324 permit unusually wide angle objective lenses to be used. For example, when shooting with an Arri Alexa camera in 4:3 mode (e.g. with sensor dimensions of 23.76 mm×17.82 mm) it is possible to use an objective with a focal length as small as 35 mm as long as its entrance pupil is relatively close to its front element. By contrast, other single-focusing afocal anamorphic front adapters are generally limited to a focal length of about 50 mm when shooting on an Arri Alexa in 4:3 mode.

In addition, the spherical focusing group 323 is independently usable as a front-mounted variable diopter focusing unit, and can be attached and used with a wide range of objectives. An advantage in doing this is that once the focusing group 323 is calibrated for various object distances the same calibration holds true for any attached objective lens so long as the objective lens itself is focused to infinity.

Detailed prescription data for Example 3 for an object at infinity is given in Table 3a below. Focusing and specification data for Example 3 are given in Tables 3b and 3c below. Note that in Table 1b T0, T2 and T28 are thicknesses in millimeters.

TABLE 3a

Prescription Data for Example 3

| Surf | Type | Radius Y | Radius X | Thickness | Glass |
|---|---|---|---|---|---|
| OBJ | STANDARD | Infinity | Infinity | Infinity | |
| 1 | STANDARD | Infinity | Infinity | 4 | S-BSL7 |
| 2 | STANDARD | 75.000 | 75.000 | 3.4 | |
| 3 | STANDARD | 76.490 | 76.490 | 16 | S-BSL7 |
| 4 | STANDARD | Infinity | Infinity | 1 | |
| 5 | TOROIDAL | 67.16196 | Infinity | 3 | S-LAL8 |
| 6 | TOROIDAL | 30.65374 | Infinity | 15 | |
| 7 | TOROIDAL | −131.7981 | Infinity | 3 | S-LAL8 |
| 8 | TOROIDAL | 90.40308 | Infinity | 11 | S-TIH1 |
| 9 | TOROIDAL | −90.40308 | Infinity | 30 | |
| 10 | TOROIDAL | −49.99873 | Infinity | 5 | S-TIH1 |
| 11 | TOROIDAL | Infinity | Infinity | 8 | S-LAL8 |
| 12 | TOROIDAL | −41.98684 | Infinity | 6.608997 | |
| 13 | STANDARD | 91.21419 | 91.21419 | 5.5 | S-LAH66 |
| 14 | STANDARD | Infinity | Infinity | 0.3 | |
| 15 | STANDARD | 42.69594 | 42.69594 | 7 | S-LAL8 |
| 16 | STANDARD | 52.72694 | 52.72694 | 13 | S-TIH1 |
| 17 | STANDARD | 24.67099 | 24.67099 | 4.5 | |
| STO | STANDARD | Infinity | Infinity | 8.521524 | |
| 19 | STANDARD | −17.72976 | −17.72976 | 1.5 | S-TIH1 |
| 20 | STANDARD | Infinity | Infinity | 11.25 | S-LAL8 |
| 21 | STANDARD | −27.59142 | −27.59142 | 0.3 | |
| 22 | STANDARD | Infinity | Infinity | 6 | S-PHM52 |
| 23 | STANDARD | −43.37946 | −43.37946 | 0.3 | |
| 24 | STANDARD | 99.20856 | 99.20856 | 4.5 | S-LAH66 |

TABLE 3a-continued

Prescription Data for Example 3

| Surf | Type | Radius Y | Radius X | Thickness | Glass |
|---|---|---|---|---|---|
| 25 | STANDARD | Infinity | Infinity | 3.4 | |
| 26 | TOROIDAL | 21.10246 | Infinity | 3.910433 | S-LAH66 |
| 27 | TOROIDAL | 18.82219 | Infinity | 1.861658 | |
| 28 | TOROIDAL | 27.67796 | Infinity | 2.681092 | S-FPL51 |
| 29 | TOROIDAL | 25.94042 | Infinity | 5.732864 | |
| 30 | TOROIDAL | −24.87157 | Infinity | 2.5 | S-LAH66 |
| 31 | TOROIDAL | −21.17806 | Infinity | 8.666861 | |
| 32 | TOROIDAL | −16.85347 | Infinity | 3 | S-LAH66 |
| 33 | TOROIDAL | −15.65407 | Infinity | 3.116995 | S-LAH58 |
| 34 | TOROIDAL | −17.06576 | Infinity | 1 | FSL5 |
| 35 | TOROIDAL | 750.3272 | Infinity | 14.3 | |
| IMA | STANDARD | Infinity | | | |

TABLE 3b

Focusing Data for Example 3

| Object Dist., T0 | T2 |
|---|---|
| Infinity | 2.000 |
| 959 | 19.300 |

TABLE 3c

Specification Data for Example 3
EXAMPLE 3 - SPECIFICATIONS

| | |
|---|---|
| Focal Length in T Plane, $f_T'$ | 59.2 mm |
| Focal Length in W Plane, $f_W'$ | 44.7 mm |
| First Objective Section Anamorphic Factor, $Q_F$ | 1.79 |
| Second Obective Section Anamorphic Factor, $Q_R$ | 1.35 |
| Net Anamorphic Factor, $Q_T$ | 1.33 |
| $M_{CRW}$ | 1.083 |
| $M_{CRT}$ | 0.380 |
| Image Width (W-Plane) | 24.00 mm |
| Image Height (T-Plane) | 13.5 mm |

Example 4

Figure 4A:
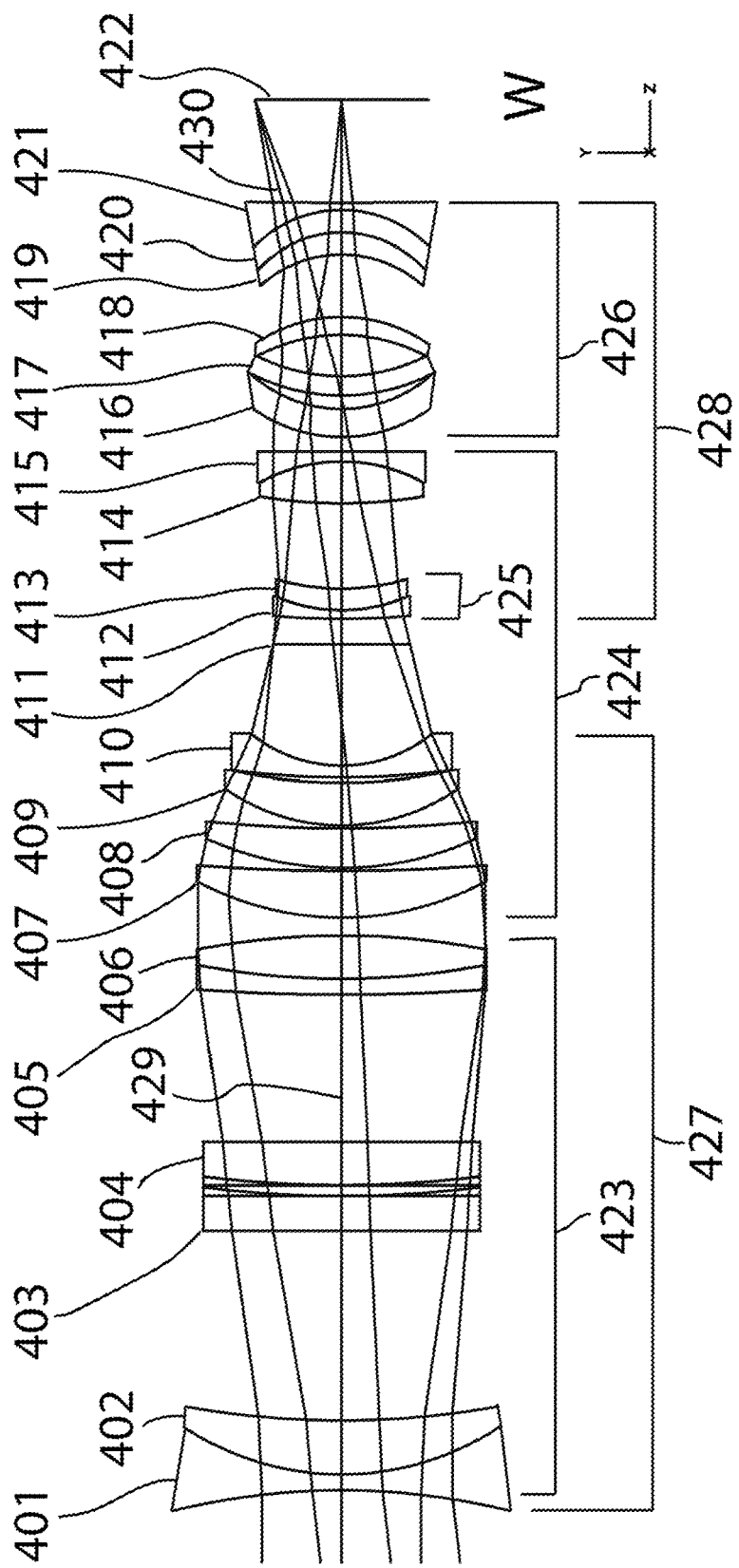
FIG. 4a is an optical layout of Example #4 in the W plane.
Figure 4B:
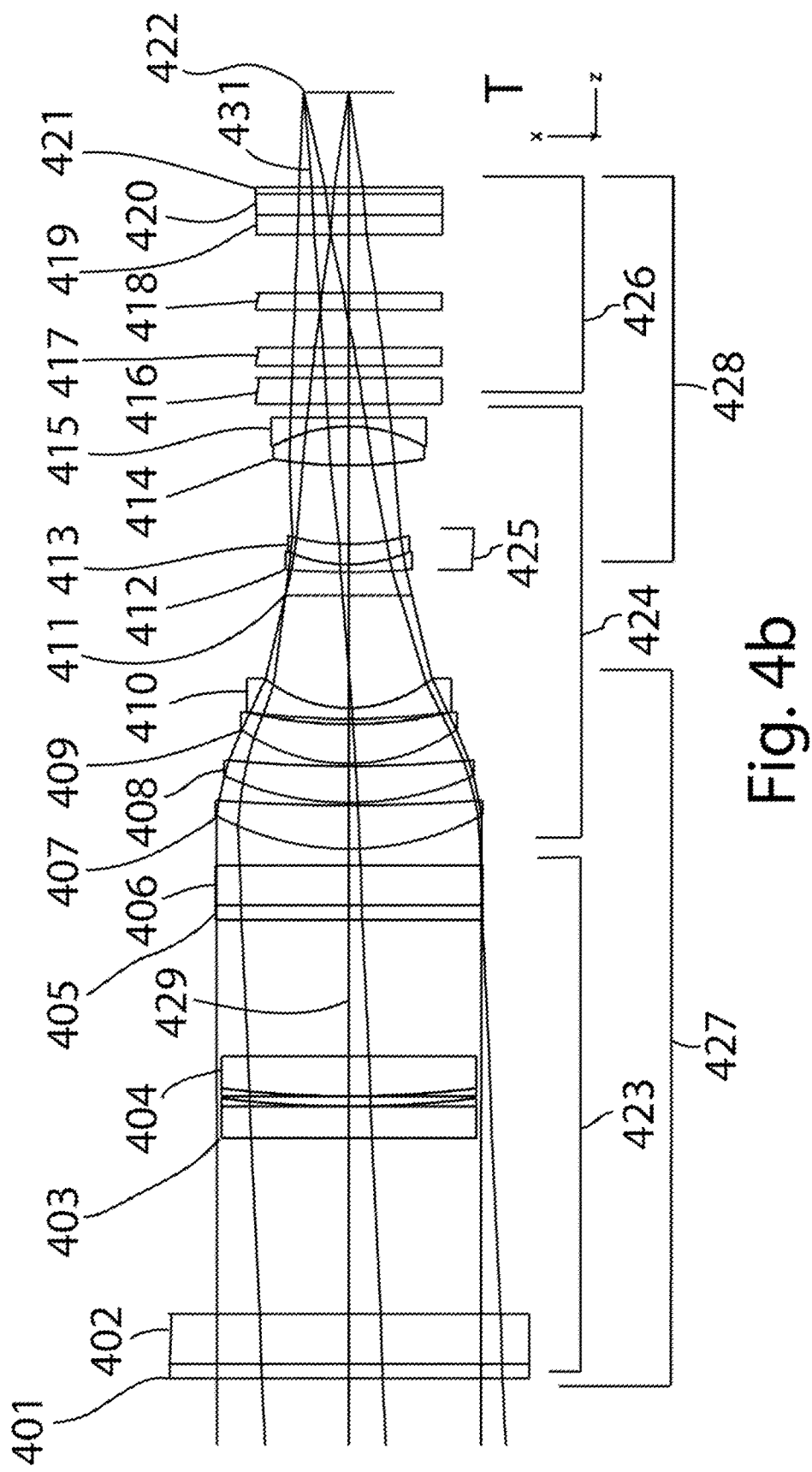
FIG. 4b is an optical layout of Example #4 in the T plane.

FIG. 4a is a layout of Example 4 of the present disclosure in its W plane. FIG. 4b is a layout of Example 4 in its T plane. Example 4 comprises, in order from an object side to an image side, a substantially afocal anamorphic group 423, an internal-focusing spherical objective 424 containing an internal focusing group 425, and a second anamorphic group 426. The aperture stop 411 lies in between the first objective section 427 and the second objective section 428, and is located inside the internal focusing spherical objective 424. The anamorphic group 423 together with 424 form an independently well-corrected anamorphic lens system having a squeeze ratio $Q_{LS}$ that is greater than the total squeeze ratio Q. The objective 424 has a focal length of 135 mm, and the anamorphic group 423 has a magnification of 0.56× in the W plane and 1.0× in the T plane. Therefore, the anamorphic lens system comprising 423 together with 424 has a focal length $f_T'$ in the T plane of 135 mm and a focal length $f_W'$ in the W plane of 75. mm. The anamorphic factor of the first objective section, $Q_F$, is 1.8.

Figure 4C:
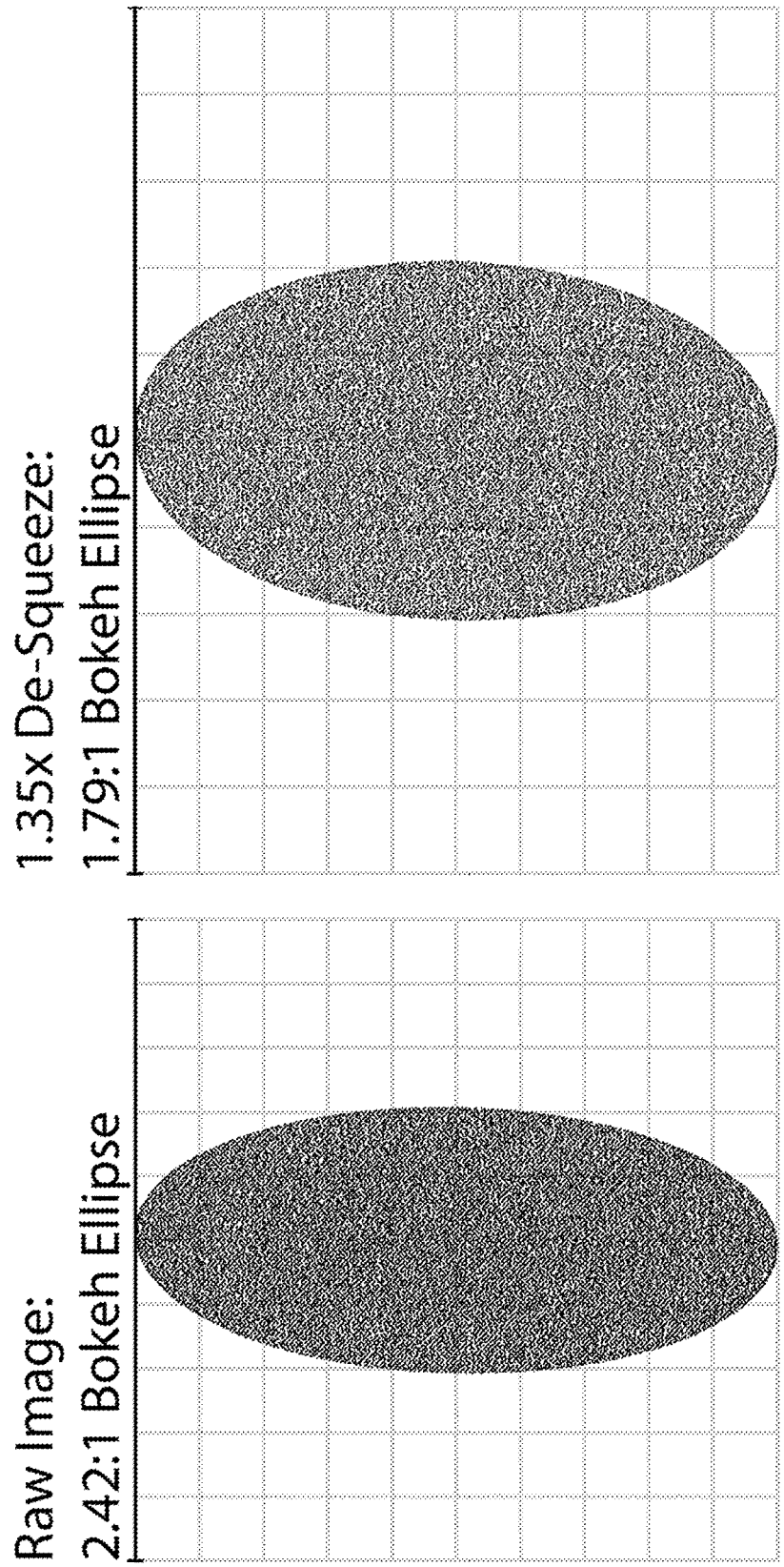
FIG. 4c is a pair of spot diagrams showing a bokeh ellipse for Example #4 before and after de-squeezing.

The second anamorphic group 426 is a rear anamorphic group that has a magnification of 1.34× in the W plane and 1.0× in the T plane. In an example, the second anamorphic group can be configured as an adapter that attaches to the internal focusing group 425. So, the net focal length $f_W'$ in the W plane is 75 mm×1.34=100 mm, and the net focal length $f_T'$ in the T plane is 134 mm×1.00=134 mm. The net anamorphic factor, $Q_T$, is thus 134/100=1.34, which is close to the desired value to produce 2.39 DCI Scope output from a 16:9 image. However, since the lens portion comprising 423 together with 424 is a front anamorphic system with Q=1.8, the system as a whole has a Q value, $Q_T$, of 1.34 with anamorphic artifacts ordinarily associated with Q~1.8 front anamorphic lens systems, as illustrated in FIG. 4c. The anamorphic factor of the second objective section, $Q_R$, is 1.34.

The substantially afocal anamorphic group 423 comprises six anamorphic elements 401 through 406. Pairs of anamorphic elements 401 and 402; and 405 and 406 are cemented together to form anamorphic cemented doublets. Elements 403 and 404 together form a Stokes lens. Elements 403 and 404 are each weak cylindrical elements with similar but opposite optical power, and their cylindrical axes are clocked at 45-degrees with respect to the W plane. During focusing, Elements 403 and 404 are counter-rotated as the internal focusing group 425 is moved along the optical axis 429 in order to ensure that the foci in both the W and T planes always coincide. The counter-rotation angle will be referred to below as the astigmatizer rotation angle, $\theta_A$. Note that $\theta_A$ is a counter-rotation angle superimposed on the astigmatizer axis clocking angle of 45-degrees.

The internal focusing objective 424 is particularly interesting both because of its compactness and its ability to focus on very close objects. For an object at infinity, objective 424 has a vertex length of just 106.6 mm, giving a telephoto ratio of 106.6/135=0.79. The minimum object-to-image distance for the objective by itself is approximately 1.2 meters, and this becomes even less when the objective is coupled with the anamorphic section 423. As a result, the anamorphic lens system per Example 4 has substantially the identical physical length of Example 2, even though Example 2 has a focal length less than 30% that of Example 4. Similar results may be obtained for focal lengths in-between that of Example 2 and Example 4, and even for focal lengths substantially shorter than Example 2. Thus, it is possible to design and build an entire series of anamorphic lenses having externally identical dimensions but with a wide range of focal lengths. This is particularly desirable in the field of cinematography because it permits the cinematographer to change lenses rapidly without making significant changes to follow-focus controls or matte box positioning, etc.

Detailed prescription data for Example 4 for an object at infinity is given in Table 4a below. Focusing and specification data for Example 4 are given in Tables 4b and 4c below. Note that in Table 4b T0, T24 and T27 are thicknesses in millimeters.

TABLE 4a

Prescription Data for Example 4

| Surf | Type | Radius Y | Radius X | Thickness | Glass |
|---|---|---|---|---|---|
| OBJ | STANDARD | Infinity | Infinity | Infinity | |
| 1 | TOROIDAL | −96.43432 | Infinity | 2.2 | H-LAK51A |
| 2 | TOROIDAL | 39.50614 | Infinity | 7.5 | H-ZF3 |
| 3 | TOROIDAL | 122.0227 | Infinity | 26.3 | |
| 4 | COORDBRK | — | — | 0 | |
| 5 | COORDBRK | — | — | 0 | |

TABLE 4a-continued

Prescription Data for Example 4

| Surf | Type | Radius Y | Radius X | Thickness | Glass |
|---|---|---|---|---|---|
| 6 | STANDARD | Infinity | Infinity | 4.8 | H-K9L |
| 7 | TOROIDAL | 300 | Infinity | 1.5 | |
| 8 | COORDBRK | — | — | 0 | |
| 9 | TOROIDAL | 303.5 | Infinity | 6 | H-K9L |
| 10 | STANDARD | Infinity | Infinity | 20.4 | |
| 11 | COORDBRK | — | — | 0 | |
| 12 | COORDBRK | — | — | 0 | |
| 13 | TOROIDAL | 277.8057 | Infinity | 2.2 | H-ZF13 |
| 14 | TOROIDAL | 105.1104 | Infinity | 6 | H-ZK9B |
| 15 | TOROIDAL | −105.1104 | Infinity | 2.5 | |
| 16 | STANDARD | 42.31456 | 42.31456 | 6.5 | S-FPL51 |
| 17 | STANDARD | 264.9224 | 264.9224 | 0.4 | |
| 18 | STANDARD | 44.97853 | 44.97853 | 5.5 | S-FPL51 |
| 19 | STANDARD | 181.8098 | 181.8098 | 0.4 | |
| 20 | STANDARD | 28.15337 | 28.15337 | 5.9 | S-LAL8 |
| 21 | STANDARD | 69.21836 | 69.21836 | 0.7382983 | |
| 22 | STANDARD | 120.4888 | 120.4888 | 1.6 | S-NBH51 |
| 23 | STANDARD | 20.03385 | 20.03385 | 16.88361 | |
| STO | STANDARD | Infinity | Infinity | 3.5 | |
| 25 | STANDARD | 109.4886 | 109.4886 | 1.2 | S-LAH59 |
| 26 | STANDARD | 22.70933 | 22.70933 | 3 | S-TIH1 |
| 27 | STANDARD | 31.9588 | 31.95880 | 11.77809 | |
| 28 | STANDARD | 69.19443 | 69.19443 | 5.8 | S-TIL6 |
| 29 | STANDARD | −23.51044 | −23.51044 | 1.4 | S-FPL51 |
| 30 | STANDARD | Infinity | Infinity | 2 | |
| 31 | TOROIDAL | 21.10246 | Infinity | 3.910433 | S-LAH66 |
| 32 | TOROIDAL | 18.82219 | Infinity | 1.861658 | |
| 33 | TOROIDAL | 27.67796 | Infinity | 2.681092 | S-FPL51 |
| 34 | TOROIDAL | 25.94042 | Infinity | 5.732864 | |
| 35 | TOROIDAL | −24.87157 | Infinity | 2.5 | S-LAH66 |
| 36 | TOROIDAL | −21.17806 | Infinity | 8.666861 | |
| 37 | TOROIDAL | −16.85347 | Infinity | 3 | S-LAH66 |
| 38 | TOROIDAL | −15.65407 | Infinity | 3.116995 | S-LAH58 |
| 39 | TOROIDAL | −17.06576 | Infinity | 1 | FSL5 |
| 40 | TOROIDAL | 750.3272 | Infinity | 14.3 | |
| IMA | STANDARD | Infinity | Infinity | | |

TABLE 4b

Focusing Data for Example 4

| Object Dist., T0 | T24 | T27 | θ$_A$ |
|---|---|---|---|
| Infinity | 3.5 | 11.778 | 0.00 deg. |
| 1964 | 5.927 | 9.351 | −3.58 deg. |
| 418.6 | 11.927 | 3.351 | −11.72 deg. |

TABLE 4c

Specification Data for Example 4
EXAMPLE 4 - SPECIFICATIONS

| | |
|---|---|
| Focal Length in T Plane, f$_T$' | 135.0 mm |
| Focal Length in W Plane, f$_W$' | 100.0 mm |
| First Objective Section Anamorphic Factor, Q$_F$ | 1.8 |
| First Objective Section Anamorphic Factor, Q$_R$ | 1.34 |
| Net Anamorphic Factor, Q$_T$ | 1.34 |
| M$_{CRW}$ | 1.981 |
| M$_{CRT}$ | 0.943 |
| Image Width (W-Plane) | 24.00 mm |
| Image Height (T-Plane) | 13.5 mm |

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An anamorphic objective for forming an image at an image plane of an object at an object plane, comprising:
    a) at least one first plane of symmetry and at least one second plane of symmetry, wherein the first plane of symmetry is perpendicular to the second plane of symmetry;
    b) at least one first objective section and at least one second objective section wherein the first objective section is located closest to the object and the second objective section is located closest to the image;
    c) an aperture stop located between the first objective section and the second objective section;
    d) at least one anamorphic optical element located in the first objective section and at least one anamorphic optical element located in the second objective section; and
    e) wherein the following conditions are met:
        i) f$_T$'>f$_W$'
        ii) M$_{CRW}$>M$_{CRT}$
        wherein f$_T$' is a focal length of the anamorphic objective with respect to the first plane of symmetry, f$_W$' is a focal length of the anamorphic objective with respect to the second plane of symmetry, M$_{CRT}$ is a chief ray angle in the first plane of symmetry at the image plane divided by a chief ray angle in the first plane of symmetry at the aperture stop, and M$_{CRW}$ is a chief ray angle in the second plane of symmetry at the image plane divided by a chief ray angle in the second plane of symmetry at the aperture stop.

2. The anamorphic objective according to claim 1, wherein a total squeeze ratio is defined by Q=f$_T$'/f$_W$', and wherein 1.0≤Q≤2.27.

3. The anamorphic objective according to claim 2, wherein 1.0≤Q≤1.7.

4. The anamorphic objective according to claim 3, wherein 1.1≤Q≤1.6.

5. The anamorphic objective according to claim 4, wherein 1.125≤Q≤1.55.

6. The anamorphic objective according to claim 1, wherein the at least one anamorphic element in the second objective section has zero optical power in the first plane of symmetry.

7. The anamorphic objective according to claim 2, wherein the second objective section comprises an objectwise group of lens elements and an imagewise group of lens elements, wherein the imagewise group of lens elements includes at least one anamorphic lens element and is configured as an adapter that operably engages with the objectwise group of lens elements.

8. The anamorphic objective according to claim 7, wherein the first objective section and the objectwise group of lens elements define a well-corrected anamorphic lens system having a squeeze ratio Q$_{LS}$ that is greater than the total squeeze ratio Q.

9. The anamorphic objective according to claim 8, wherein:
    a. the first objective section has a first squeeze ratio Q$_F$ in the range 1.6<Q$_F$<2.5;

b. the second objective section has a second squeeze ratio $Q_R$ in the range $1.0 < Q_R < 1.6$; and c. wherein the ratio $Q_F/Q_R$ is in the range $1.0 < Q_F/Q_R < 2.27$.

10. The anamorphic objective according to claim 9, wherein $1.7 < Q_F < 2.0$ and $1.1 < Q_R < 1.5$, and $1.13 < Q_F/Q_R < 1.82$.

11. The anamorphic objective according to claim 1, wherein a first objective section comprises a Stokes lens.

12. An anamorphic objective that comprises in order from an object plane to an image plane:
   a) a first objective section having one or more first anamorphic lens elements that define a first squeeze ratio $Q_F$, wherein $1.6 < Q_F < 2.5$;
   b) a second objective section having one or more second anamorphic lens elements that define a first squeeze ratio $Q_R$, wherein $1.1 < Q_R < 1.6$;
   c) an aperture stop disposed between the first and second objective sections; and
   d) wherein a total squeeze ratio $Q = Q_F/Q_R$ is in the range $1.0 < Q < 2.27$.

13. The anamorphic objective according to claim 12, wherein $1.7 < Q_F < 2.0$ and $1.1 < Q_R < 1.5$, and wherein $1.13 < Q < 1.82$.

14. The anamorphic objective according to claim 13, wherein $1.4 \leq Q \leq 1.6$.

15. The anamorphic objective according to claim 12, wherein the second objective section comprises an objectwise lens group and an imagewise lens group, wherein the imagewise lens group includes at least one anamorphic lens element and is configured as an adapter that operably engages with the objectwise lens group.

16. The anamorphic objective according to claim 15, wherein the first objective section and the objectwise lens group define a well-corrected anamorphic lens system having a first squeeze ratio $Q_{LS}$ that is greater than the total squeeze ratio Q.

17. An anamorphic objective that comprises in order from an object plane to an image plane:
   a) a first objective section having one or more first anamorphic lens elements and a first squeeze ratio $Q_F$;
   b) a second objective section having one or more second anamorphic lens elements and a second squeeze ratio $Q_R$;
   c) an aperture stop disposed between the first and second objective sections; and
   d) wherein the first squeeze ratio $Q_F$ of the first objective lens section defines at least one residual anamorphic characteristic while the first and second objective sections define a total squeeze ratio Q that is less than $Q_F$.

18. The anamorphic objective according to claim 17, wherein $Q = Q_F/Q_R$.

19. The anamorphic objective according to claim 17, wherein the at least one residual characteristic comprises a first amount of elliptical bokeh that is greater than a second amount of bokeh associated with the total squeeze ratio Q as if the second amount of bokeh were produced with a front anamorphic lens.

20. The anamorphic objective according to claim 17, wherein the at least one residual characteristic further comprises a differential depth of field.

* * * * *